(12) United States Patent
Abotabl et al.

(10) Patent No.: US 11,917,679 B2
(45) Date of Patent: Feb. 27, 2024

(54) MULTIPLE THRESHOLDS FOR UNLICENSED CHANNEL ACCESS FOR FULL-DUPLEX NODES

(71) Applicant: QUALCOMM Incorporated, San Diego, CA (US)

(72) Inventors: Ahmed Attia Abotabl, San Diego, CA (US); Muhammad Sayed Khairy Abdelghaffar, San Jose, CA (US); Abdelrahman Mohamed Ahmed Mohamed Ibrahim, San Diego, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 453 days.

(21) Appl. No.: 17/332,228

(22) Filed: May 27, 2021

(65) Prior Publication Data

US 2022/0386367 A1 Dec. 1, 2022

(51) Int. Cl.
*H04W 74/08* (2009.01)
*H04W 24/08* (2009.01)
*H04L 5/14* (2006.01)

(52) U.S. Cl.
CPC ........... *H04W 74/0808* (2013.01); *H04L 5/14* (2013.01); *H04W 24/08* (2013.01)

(58) Field of Classification Search
CPC .................................................. H04W 74/0808
See application file for complete search history.

(56) References Cited

U.S. PATENT DOCUMENTS

| | | | | |
|---|---|---|---|---|
| 2020/0313779 | A1* | 10/2020 | Kim | H04B 17/24 |
| 2022/0046553 | A1* | 2/2022 | Kim | H04B 17/318 |
| 2023/0261771 | A1* | 8/2023 | Garcia Rodriguez | H04W 24/02 370/252 |

* cited by examiner

*Primary Examiner* — Abdeltif Ajid
(74) *Attorney, Agent, or Firm* — Holland & Hart / Qualcomm

(57) ABSTRACT

Methods, systems, and devices for wireless communications are described. A full-duplex device may perform a channel access procedure using multiple threshold values to determine whether self-interference at the full-duplex device is affecting the channel access procedure. For example, if a first amount of energy detected during a first sensing operation of the channel access procedure is determined to be between a first threshold value and a second threshold value, the full-duplex device may perform a self-interference measurement on the shared channel and may transmit on the shared channel if the self-interference measurement exceeds a self-interference threshold value. Additionally or alternatively, if the self-interference measurement does not exceed the self-interference threshold value, the full-duplex device may refrain from transmitting on the shared channel. In some examples, the self-interference measurement may include a correlation measurement, a signal-to-noise ratio (SNR) measurement, or a combination thereof.

30 Claims, 20 Drawing Sheets

MULTIPLE THRESHOLDS FOR UNLICENSED CHANNEL ACCESS FOR FULL-DUPLEX NODES

FIELD OF TECHNOLOGY

The following relates to wireless communications, including multiple thresholds for unlicensed channel access for full-duplex nodes.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support multiple thresholds for unlicensed channel access for full-duplex nodes. Generally, the described techniques provide for a full-duplex node or full-duplex device (e.g., full-duplex user equipment (UE), full-duplex base station, etc.) to perform a channel access procedure using multiple threshold values to determine whether self-interference at the full-duplex device is affecting the channel access procedure. For example, the full-duplex device may perform a first sensing operation of the channel access procedure using a first threshold value and a second threshold value to detect a first amount of energy on a shared channel. If the first amount of energy is determined to be between the first threshold value and the second threshold value, the full-duplex device may perform a self-interference measurement on the shared channel and may transmit on the shared channel if the self-interference measurement exceeds a self-interference threshold value (e.g., self-interference at the full-duplex device is affecting the first amount of energy detected on the shared channel). Additionally or alternatively, if the self-interference measurement does not exceed the self-interference threshold value (e.g., the self-interference at the full-duplex device is not affecting the first amount of energy detected on the shared channel), the full-duplex device may refrain from transmitting. In some examples, the self-interference measurement may include a correlation measurement, a signal-to-noise ratio (SNR) measurement, or a combination thereof. Additionally, the full-duplex device may receive a control message that indicates the first threshold value, the second threshold value, the self-interference threshold value, or any combination thereof.

A method for wireless communications at a full-duplex wireless device is described. The method may include identifying a first threshold value and a second threshold value that exceeds the first threshold value for a channel access procedure on a shared channel and a self-interference threshold value for the channel access procedure, performing a first sensing operation for the channel access procedure to detect a first amount of energy on the shared channel, performing a self-interference measurement of a transmission from the full-duplex wireless device, the self-interference measurement being performed based on the first amount of energy on the shared channel occurring between the first threshold value and the second threshold value, and transmitting a message via the shared channel based on the self-interference measurement exceeding the self-interference threshold value.

An apparatus for wireless communications at a full-duplex wireless device is described. The apparatus may include a processor, memory coupled with the processor, and instructions stored in the memory. The instructions may be executable by the processor to cause the apparatus to identify a first threshold value and a second threshold value that exceeds the first threshold value for a channel access procedure on a shared channel and a self-interference threshold value for the channel access procedure, perform a first sensing operation for the channel access procedure to detect a first amount of energy on the shared channel, perform a self-interference measurement of a transmission from the full-duplex wireless device, the self-interference measurement being performed based on the first amount of energy on the shared channel occurring between the first threshold value and the second threshold value, and transmit a message via the shared channel based on the self-interference measurement exceeding the self-interference threshold value.

Another apparatus for wireless communications at a full-duplex wireless device is described. The apparatus may include means for identifying a first threshold value and a second threshold value that exceeds the first threshold value for a channel access procedure on a shared channel and a self-interference threshold value for the channel access procedure, means for performing a first sensing operation for the channel access procedure to detect a first amount of energy on the shared channel, means for performing a self-interference measurement of a transmission from the full-duplex wireless device, the self-interference measurement being performed based on the first amount of energy on the shared channel occurring between the first threshold value and the second threshold value, and means for transmitting a message via the shared channel based on the self-interference measurement exceeding the self-interference threshold value.

A non-transitory computer-readable medium storing code for wireless communications at a full-duplex wireless device is described. The code may include instructions executable by a processor to identify a first threshold value and a second threshold value that exceeds the first threshold value for a channel access procedure on a shared channel and a self-interference threshold value for the channel access procedure, perform a first sensing operation for the channel access procedure to detect a first amount of energy on the shared channel, perform a self-interference measurement of a transmission from the full-duplex wireless device, the self-interference measurement being performed based on the first amount of energy on the shared channel occurring between the first threshold value and the second threshold value, and transmit a message via the shared channel based on the self-interference measurement exceeding the self-interference threshold value.

In some examples of the method, apparatuses, and non-transitory computer-readable medium described herein, identifying the first threshold value, the second threshold value, and the self-interference threshold value may include operations, features, means, or instructions for receiving, from a base station, a control message indicating the first threshold value, the second threshold value, the self-interference threshold value, or any combination thereof.

Some examples of the method, apparatuses, and non-transitory computer-readable medium described herein may further include operations, features, means, or instructions for performing a second sensing operation for the channel access procedure to sense a second amount of energy on the shared channel and transmitting a second message on the shared channel based on the second amount of energy on the shared channel being below both the first threshold value and the second threshold value.

In some examples of the method, apparatuses, and non-transitory computer-readable medium described herein, transmitting the message may include operations, features, means, or instructions for transmitting the message on the shared channel based on the self-interference measurement that may be a correlation measurement generated using a signal transmitted from the full-duplex wireless device via the shared channel.

In some examples of the method, apparatuses, and non-transitory computer-readable medium described herein, transmitting the message on the shared channel may include operations, features, means, or instructions for transmitting the message on the shared channel based on the correlation measurement being above the self-interference threshold value.

In some examples of the method, apparatuses, and non-transitory computer-readable medium described herein, the self-interference measurement may be an SNR measurement.

Some examples of the method, apparatuses, and non-transitory computer-readable medium described herein may further include operations, features, means, or instructions for refraining from transmitting on the shared channel based on the self-interference measurement that may be a correlation measurement generated using a signal transmitted from the full-duplex wireless device via the shared channel.

Some examples of the method, apparatuses, and non-transitory computer-readable medium described herein may further include operations, features, means, or instructions for refraining from transmitting on the shared channel based on the correlation measurement falling below the self-interference threshold value.

In some examples of the method, apparatuses, and non-transitory computer-readable medium described herein, the correlation measurement includes an SNR measurement.

Some examples of the method, apparatuses, and non-transitory computer-readable medium described herein may further include operations, features, means, or instructions for performing a second sensing operation for the channel access procedure to sense a second amount of energy on the shared channel and refraining from transmitting on the shared channel based on the second amount of energy being above both the first threshold value and the second threshold value.

In some examples of the method, apparatuses, and non-transitory computer-readable medium described herein, the first amount of energy detected on the shared channel includes an amount of self-interference at the full-duplex wireless device.

In some examples of the method, apparatuses, and non-transitory computer-readable medium described herein, the full-duplex wireless device may be a UE or a base station.

A method for wireless communications at a base station is described. The method may include transmitting, to a UE, a control message indicating a first threshold value and a second threshold value that exceeds the first threshold value for a channel access procedure, and indicating a self-interference threshold value for the channel access procedure for performing a self-interference measurement when a detected amount of energy of a shared channel occurs between the first threshold value and the second threshold value and receiving, from the UE, a message on the shared channel based on the first threshold value, the second threshold value, and the self-interference threshold value.

An apparatus for wireless communications at a base station is described. The apparatus may include a processor, memory coupled with the processor, and instructions stored in the memory. The instructions may be executable by the processor to cause the apparatus to transmit, to a UE, a control message indicating a first threshold value and a second threshold value that exceeds the first threshold value for a channel access procedure, and indicating a self-interference threshold value for the channel access procedure for performing a self-interference measurement when a detected amount of energy of a shared channel occurs between the first threshold value and the second threshold value and receive, from the UE, a message on the shared channel based on the first threshold value, the second threshold value, and the self-interference threshold value.

Another apparatus for wireless communications at a base station is described. The apparatus may include means for transmitting, to a UE, a control message indicating a first threshold value and a second threshold value that exceeds the first threshold value for a channel access procedure, and indicating a self-interference threshold value for the channel access procedure for performing a self-interference measurement when a detected amount of energy of a shared channel occurs between the first threshold value and the second threshold value and means for receiving, from the UE, a message on the shared channel based on the first threshold value, the second threshold value, and the self-interference threshold value.

A non-transitory computer-readable medium storing code for wireless communications at a base station is described. The code may include instructions executable by a processor to transmit, to a UE, a control message indicating a first threshold value and a second threshold value that exceeds the first threshold value for a channel access procedure, and indicating a self-interference threshold value for the channel access procedure for performing a self-interference measurement when a detected amount of energy of a shared channel occurs between the first threshold value and the second threshold value and receive, from the UE, a message on the shared channel based on the first threshold value, the second threshold value, and the self-interference threshold value.

In some examples of the method, apparatuses, and non-transitory computer-readable medium described herein, receiving the message on the shared channel may include operations, features, means, or instructions for receiving the message on the shared channel based on the detected amount of energy on the shared channel being below both the first threshold value and the second threshold value.

In some examples of the method, apparatuses, and non-transitory computer-readable medium described herein, receiving the message on the shared channel may include operations, features, means, or instructions for receiving the message on the shared channel based on the detected amount of energy on the shared channel occurring between the first threshold value and the second threshold value and a correlation measurement satisfying the self-interference threshold value.

In some examples of the method, apparatuses, and non-transitory computer-readable medium described herein, the correlation measurement includes the self-interference measurement, an SNR measurement, or a combination thereof.

DETAILED DESCRIPTION

Figure 1:
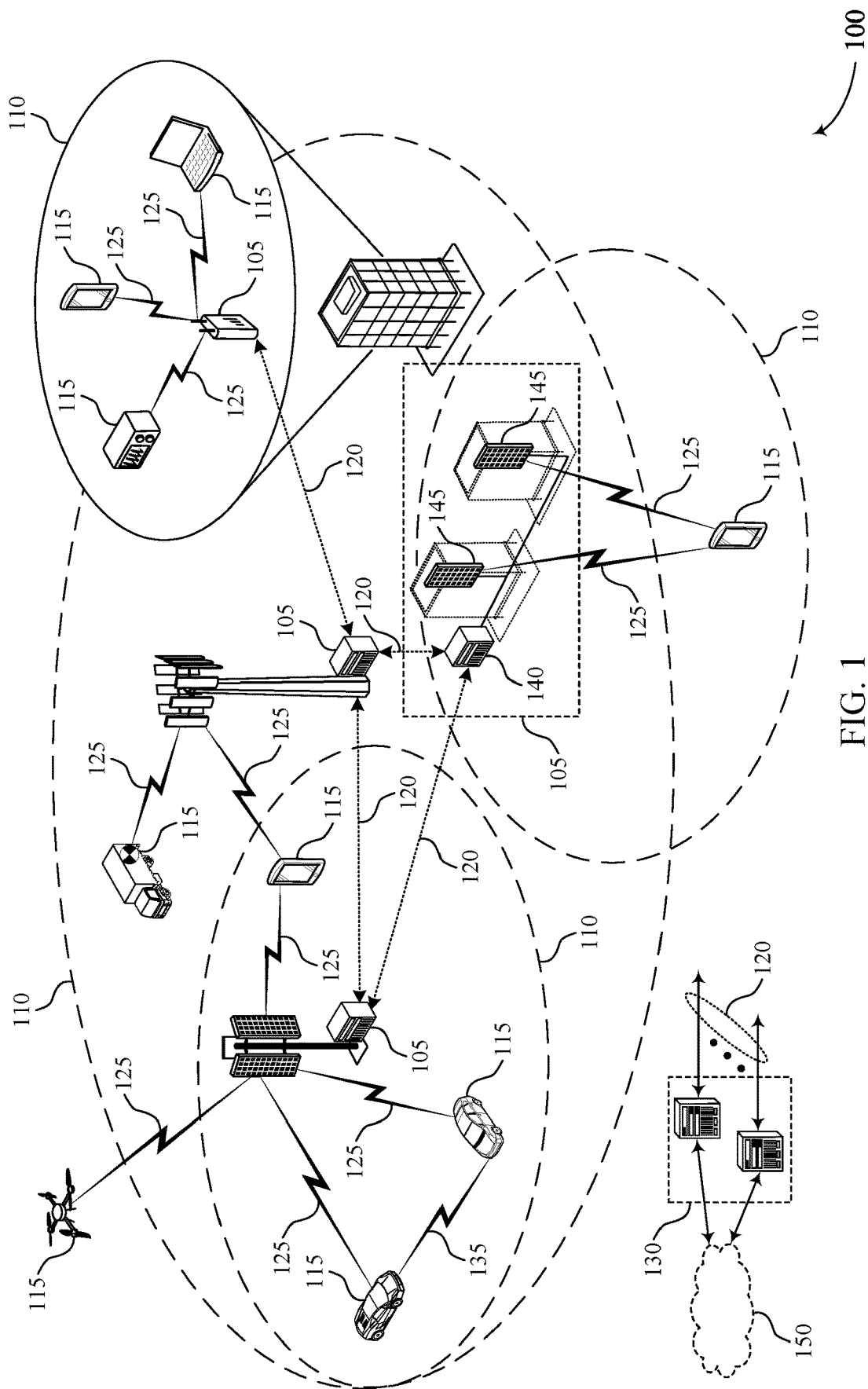
FIG. 1 illustrates an example of a wireless communications system that supports multiple thresholds for unlicensed channel access for full-duplex nodes in accordance with aspects of the present disclosure.

A wireless communications system may include various communication devices, such as a user equipment (UE) and a base station, which may provide wireless communication services to the UE. For example, the base station may be a next-generation NodeB (which may be referred to as a gNB) that may support multiple radio access technologies including 4G systems, such as 4G LTE, as well as 5G systems (which may be referred to as 5G NR). In the wireless communications system, a UE may operate in a full-duplex mode, where the UE may transmit on an uplink and receive on a downlink concurrently, either on the same frequency resource or on different frequency resources separated by a guard band. In some cases, the channel may be part of an unlicensed or shared radio frequency spectrum band and may be shared with other communication devices in the wireless communications system, such as other UEs.

When a node (e.g., a UE, a base station, etc.) is configured for full-duplex operations, the full-duplex node may experience a self-interference based on attempting to transmit and receive messages at a same time. For example, at a full-duplex UE, uplink transmissions from the UE to a base station may impact an ability of the UE to receive downlink messages from the base station at a same time. This issue of self-interference may further affect channel access procedures performed by the full-duplex node (e.g., listen-before-talk (LBT), clear channel assessment (CCA), etc.) in unlicensed operation. The channel access procedures may include the full-duplex node sensing whether a shared channel is available based on a detected amount of energy on the shared channel. If the detected amount of energy is less than a given threshold, the full-duplex node may determine the channel is available and proceed to transmit on the channel. Additionally or alternatively, if the detected amount of energy is greater than the given threshold, the full-duplex node may determine the channel is occupied (e.g., another device is currently communicating on the channel) and may perform another channel access procedure (e.g., for the same channel or a different channel). However, because the node is a full-duplex node, self-interference may affect the detected amount of energy such that the full-duplex node is unsure whether the detected amount of energy is a result of other devices communicating on the channel, a result of the self-interference, or both.

As described herein, based on being a full-duplex node, the full-duplex node may use two threshold values when performing a channel access procedure. The two threshold values may split a range of detected energy into three parts. A first part may include detected energy amounts that are greater than both threshold values (e.g., higher than a highest threshold value), and the full-duplex node may determine the channel is busy or occupied if the detected amount of energy falls within this first part. A second part may include detected energy amounts that are less than both threshold values (e.g., lower than a lowest threshold value), and the full-duplex node may determine the channel is available for subsequent transmissions if the detected amount of energy falls within this second part. A third part may include detected energy values that fall between the first threshold value and the second threshold value. If the detected amount of energy falls within this third part (e.g., between the first threshold value and the second threshold value), the full-duplex node may then perform a self-interference detection procedure to determine whether to transmit on the channel. For example, the full-duplex node may transmit on the channel when the detected energy is due to a high level of self-interference and may otherwise refrain from transmitting if the detected energy is interference resulting from other wireless devices.

The self-interference detection procedure may include the full-duplex node measuring a correlation or a signal quality metric (e.g., a signal-to-noise ratio (SNR)) from a signal transmitted by the full-duplex node at a receiving perspective of the full-duplex node (e.g., sensing side). In some examples, the full-duplex node may be configured with a correlation/signal quality metric threshold value (e.g., a third threshold value), such that if the correlation or signal quality metric measurement is below this correlation/signal quality metric threshold value, the full-duplex node may determine the detected amount of energy was not a cause of self-interference and may determine the channel is busy. Additionally or alternatively, if the correlation or signal quality metric measurement is above this correlation/signal quality metric threshold value, the full-duplex node may determine the detected amount of energy was a cause of self-interference and may determine the channel is available for subsequent communications.

Aspects of the disclosure are initially described in the context of wireless communications systems. Additionally, aspects of the disclosure are illustrated through additional wireless communications systems, resource configurations, and a process flow. Aspects of the disclosure are further illustrated by and described with reference to apparatus diagrams, system diagrams, and flowcharts that relate to multiple thresholds for unlicensed channel access for full-duplex nodes.

FIG. 1 illustrates an example of a wireless communications system 100 that supports multiple thresholds for unlicensed channel access for full-duplex nodes in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest SNR, or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Wireless communications system 100 may include one or more UEs 115 (e.g., or additional wireless devices) configured to operate in a full-duplex mode. The UE 115 configured to operate in the full-duplex mode may be able to both transmit and receive signals within a same frame or subframe. A UE 115 that operates in the full-duplex mode may use in-band full-duplex (IBFD), sub-band full-duplex (SBFD), or a combination thereof. A UE 115 that supports IBFD may transmit and receive on same time and frequency resources. Additionally or alternatively, a UE 115 that supports SBFD may transmit and receive on same time resources but on different frequency resources. Wireless communications system 100 may also include one or more base stations 105 configured to operate in a full-duplex mode. In some examples, base stations 105 configured to operate in the full-duplex mode may include at least two panels, where one panel is used for transmitting and another panel is used for receiving, which may allow for simultaneous transmitting and receiving operations.

Based on being configured to operate in the full-duplex mode, a full-duplex device may encounter self-interference (e.g., transmitting signaling in a first transmission direction may affect an ability of the full-duplex device to successfully receive signaling in a second transmission direction at a same time). In some cases, the full-duplex device may use one or more interference cancellation techniques for self-interference mitigation. For example, the full-duplex device may achieve improved isolation of the self-interference (e.g., greater than 50 decibels (dB)) based on using separate panels for simultaneous transmission and reception operations (e.g., a first panel is used for downlink transmissions at both edges of a frequency band and a second panel is used for uplink reception at a middle of the frequency band). Additionally or alternatively, for SBFD operations (e.g., for greater than 40 dB isolation), the full-duplex device may communicate such that different transmission directions occur in different portions of a frequency band, may use a guard band exists between the different transmission directions, may use receiver windowed overlap-and-add (WOLA) processing to reduce an adjacent channel leakage ratio (ACLR) leakage to an uplink signal, may use an analog low-pass filter (LPF) to improve an analog-to-digital converter (ADC) dynamic range, may improve receiver automatic gain control (AGC) states to improve a noise figure (NF), or a combination thereof to aid in mitigating self-interference. Additionally or alternatively, for a digital integrated circuit (IC) of an ACLR leakage (e.g., for greater than 20 dB isolation), the full-duplex device may use a non-linear model per each transmission-reception pair to aid in mitigating self-interference.

In some cases, devices in wireless communications system 100 may operate in an unlicensed radio frequency spectrum band, where the unlicensed radio frequency spectrum band is shared with other communication devices (e.g., other UEs) in wireless communications system 100. For example, in unlicensed radio frequency spectrum band, NR may coexist with, for example, Wi-Fi or any other wireless communications network. In the case of Wi-Fi, NR and Wi-Fi may coexist in the 5 GHz and 6 GHz band. The other communications network may perform channel access at a specific frequency units, for example, Wi-Fi channel access may be in 20 MHz units.

To gain access to a channel on an unlicensed radio frequency spectrum band, a device may perform a CCA procedure, such as an LBT procedure, before transmission. The CCA procedure may occur over a set of CCA resources. In some cases, the resources in time and frequency at which the device (e.g., a UE 115, a base station 105, etc.) performs energy measurements for a CCA may be referred to as a CCA window. For an LBT procedure, a device or a node may sense the channel by detecting the energy in a given frequency band. If the detected energy is below a given threshold, the device may determine that the channel is available, and the device can use the channel for transmission. If the detected energy is above the threshold, the device may determine that the channel is occupied, and the device may back off and perform another LBT until the channel is determined to be available. In some examples, the LBT procedure may be performed within a portion of the LBT resources. Upon performing a successful LBT procedure (e.g., the channel is available), the device may be granted a channel occupancy time (COT) to transmit on the channel.

In order to perform LBT procedures in the frequency domain, the network may determine units of basic channel access, such as LBT bandwidth. Each LBT bandwidth may include an available set of RBs (e.g., multiple RB sets within a BWP). The RB set may be derived from intra-cell guard band signaling, which may be configured separately for downlink and uplink (e.g., intraCellGuardBandDL and intraCellGuardBandUL). It may be that the guard band size is zero when a base station 105 or UE 115 may perform an all or nothing transmission. Therefore, in the frequency domain, the LBT resources are determined based on RB sets.

A channel access LBT mechanism may be one of multiple different types of LBT procedure, which may be referred to as different categories of LBT procedure. Load based equipment (LBE) may use a Category 4 (Cat 4) LBT to contend for a COT and may use a Category 2 (Cat 2) LBT procedure for inside the COT. Cat 2 LBT procedures may be used for discovery reference signal (DRS) transmission under some constraints, such as if the device does not have unicast data, a length of the transmission is 1 ms or shorter, and a duty cycle does not exceed 1/20. A Cat 4 LBT procedure may have a contention window and in some cases be referred to as a Type 1. A Type 2A Cat 2 LBT procedure may have a 25 microsecond gap, and a Type 2B Cat 4 LBT procedure may have a 16 microsecond gap. A Cat 1 LBT procedure (Type 2B) may have no more than a 16 microsecond gap without channel sensing, and a transmission burst length of, for example, 0.584 milliseconds may be applied when using the Cat 1 LBT procedure.

A full-duplex device or full-duplex node (e.g., a full-duplex UE 115, a full-duplex base station 105, etc.) may receive signaling in a first transmission direction (e.g., downlink communications) and transmit signaling in a second transmission direction (e.g., uplink communications) at the same time. For IBFD, the full-duplex device may transmit and receive on same time and frequency resources. For sub-band FDD (e.g., flexible duplex), the full-duplex device may transmit and receive at a same time (e.g., on same time resources) but on different frequency resources. Flexible duplex may be referred to as SBFD. The frequency resources for different transmission directions (e.g., uplink and downlink) may be separated by a guard band in the frequency domain.

However, in some cases, signaling in the first transmission direction received at the full-duplex device may affect a CCA procedure performed for a channel prior to transmitting signaling in the second transmission direction on the channel (e.g., downlink signal energy may cause the CCA outcome to fail preventing uplink transmission). For example, the signaling in the first transmission direction may cause self-interference at the full-duplex device, affecting the signaling in the second transmission direction on the channel, which may impact the CCA procedure (e.g., the self-interference may result in higher detected amounts of energy for the CCA procedure, such that the full-duplex node is unsure whether the detected amount of energy is a result of the self-interference or a result of other devices currently accessing the channel). Additionally, even with applying different interference cancellation techniques (e.g., using separate panels, using different frequency resources, using a guard band, etc.), residual self-interference may impact a sensing operation of the CCA procedure. That is, the residual self-interference may raise an amount of energy detected during the sensing operation, which might confuse the full-duplex device on whether the channel is available for transmission or not.

As described herein, wireless communications system 100 may support techniques to for determining whether self-interference is affecting a channel access procedure (e.g., CCA procedure, LBT procedure, etc.) at a full-duplex device (e.g., a full-duplex UE 115, a full-duplex base station 105, etc.). For example, the full-duplex device may use multiple threshold values for the channel access procedure to determine if the self-interference is affecting the channel access procedure. In some examples, the full-duplex device may first use a first threshold value and a second threshold value, where if a detected amount of energy on a channel falls between the first threshold value and the second threshold value, the full-duplex device then performs a self-interference detection procedure. The self-interference detection procedure may include the full-duplex device comparing a self-interference measurement (e.g., correlation measurement, SNR measurement, etc.) against a third threshold value (e.g., a self-interference threshold value). Accordingly, if the self-interference measurement is above the third threshold value, the full-duplex device may determine the detected amount of energy on the channel is a result of self-interference and may determine the channel is available for subsequent communications. Additionally or alternatively, if the self-interference measurement is below the third threshold value, the full-duplex device may determine the detected amount of energy on the channel is not a result of self-interference, may determine the channel is busy (e.g., not available), and may refrain from transmitting on the channel.

Figure 2:
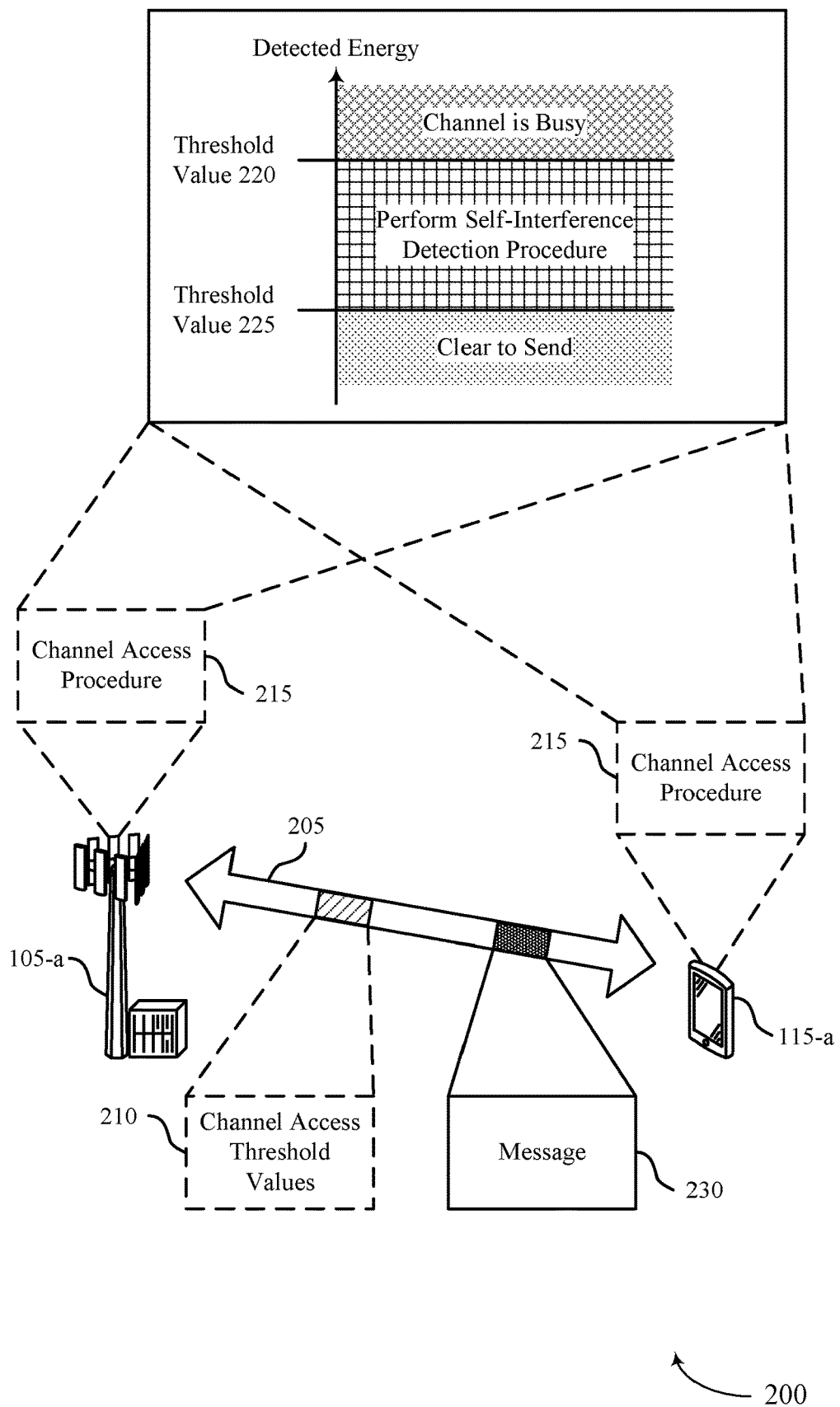
FIGS. 2 and 3 illustrate examples of wireless communications systems in accordance with aspects of the present disclosure.

FIG. 2 illustrates an example of a wireless communications system 200 that supports multiple thresholds for unlicensed channel access for full-duplex nodes in accordance with aspects of the present disclosure. In some examples, wireless communications system 200 may implement aspects of or may be implemented by aspects of wireless communications system 100. For example, wireless communications system 200 may include a base station 105-a and a UE 115-a, which may represent examples of corresponding base stations 105 and UEs 115, respectively, as described with reference to FIG. 1. Additionally, base station 105-a and UE 115-a may communicate using resources of a carrier 205. In some examples, base station 105-a, UE 115-a, or both may support half-duplex communications or full-duplex communications or both.

As described previously with reference to FIG. 1, based on supporting and/or operating in full-duplex communications, base station 105-a, UE 115-a, or both may experience a self-interference in a first transmission direction (e.g., uplink, downlink, sidelink, etc.) based on on-going communications in a second transmission direction that is different than the first transmission direction occurring at a same time. This self-interference may affect a channel access procedure (e.g., CCA procedure, LBT procedure, etc.) performed by base station 105-a, UE 115-a, or both to access the resources of carrier 205 prior to communicating on carrier 205. For example, the resources of carrier 205 used for communications between UE 115-a and base station 105-a may include shared resources, a shared frequency band, unlicensed frequency resources, etc., such that base station 105-a, UE 115-a, or both perform the channel access procedure to determine whether the resources of carrier 205 are available prior to using those resources for subsequent communications. However, the self-interference may raise an amount of energy detected during sensing operations of the channel access procedure, which might confuse a full-duplex device (e.g., base station 105-a, UE 115-a, or both) on whether the resources of carrier 205 (e.g., a channel) is available for transmission.

Using the techniques described herein, base station 105-a, UE 115-a, or both (e.g., or any additional device in wireless communications system 200) may use two or more channel access threshold values 210 to perform a channel access procedure 215 for comparing detected energy against to determine whether self-interference is affecting channel access procedure 215. For example, the two or more channel access threshold values 210 may include at least a first threshold value 220 and a second threshold value 225. In some examples, if UE 115-a is operating in full-duplex communications (e.g., UE 115-a is the full-duplex device), base station 105-a may transmit a control message to UE 115-a that includes the two or more channel access threshold values 210 to configure UE 115-a with the two or more channel access threshold values 210 for performing channel access procedure 215 at UE 115-a. Additionally or alternatively, if base station 105-a is operating in full-duplex communications (e.g., base station 105-a is the full-duplex device), base station 105-a may identify or determine the two or more channel access threshold values 210 to apply when performing channel access procedure 215 itself. In some examples, first threshold value 220 and second threshold value 225 may split a range of detected energy from a sensing operation of channel access procedure 215 into three parts.

A first part of the range of detected energy may include detected energy levels that are higher than first threshold value 220 (e.g., a highest threshold value), such that detected energy levels that fall within this first part may be determined to not be a result of self-interference based on being too high, and the full-duplex device may determine the channel is busy (e.g., and may refrain from transmitting on the channel) regardless of full-duplex operations. That is, if the detected energy on a channel is higher than a highest threshold, the full-duplex device may determine that the channel is busy and may refrain from transmitting on the channel. A second part of the range of detected energy may include detected energy levels that are lower than second threshold value 225 (e.g., a lowest threshold value), such that detected energy levels that fall within this second part may be determined to not be a result of self-interference based on being too low, and the full-duplex device may determine the channel is clear to send (e.g., and may proceed with transmitting a message 230 on the resources of carrier 205). That is, if the detected energy on a channel is below a smallest threshold, the full-duplex device may consider the channel is clear to send or clear to transmit regardless of full-duplex operations.

A third part of the range of detected energy may include detected energy levels that are between first threshold value 220 and second threshold value 225, such that detected energy levels that fall within this third part may or may not be a result of self-interference. For example, if the detected energy level falls between first threshold value 220 and second threshold value 225, the full-duplex device may perform extra procedures to determine whether this detected energy is due to self-interference. That is, if the detected energy on a channel is between the two configured threshold values, the full-duplex device may start a self-interference detection procedure to determine whether the channel is available (e.g., determine whether to transmit message 230 on the channel). For example, the self-interference detection procedure may enable the full-duplex device to determine whether the detected energy on the channel is a result of the self-interference (e.g., which may indicate that the detected energy level is not a result of other devices occupying the channel and, hence, the channel is available for the full-duplex device to transmit message 230) or not (e.g., which may indicate that the detected energy level is a result of other device occupying the channel rather than the self-interference and, hence, the channel is not available for subsequent communications).

As part of the self-interference detection procedure, if the detected energy is between the two configured threshold values (e.g., between first threshold value 220 and second threshold value 225), the full-duplex device may start measuring a correlation or SNR of its own transmitted signals at a receiver side or receiver perspective of the full-duplex device (e.g., sensing side). For example, this correlation or SNR measurement may be considered a self-interference measurement. For SBFD operations, the full-duplex device may perform the correlation or SNR measurement for a third and/or fifth degree kernel of a transmitted signal because the third and/or fifth kernels may be considered strongest kernels that interfere on a sensing band. Additionally or alternatively, for IBFD operations, the full-duplex device may perform the correlation or SNR measurement directly with the transmitted signals.

In some examples, the full-duplex device may compare the correlation or SNR measurement against a correlation/SNR threshold value (e.g., a third threshold value of the two or more channel access threshold values 210, such as a self-interference threshold value). Similar to the techniques described previously, if UE 115-*a* is operating in full-duplex communications (e.g., UE 115-*a* is the full-duplex device), base station 105-*a* may transmit an indication of the correlation/SNR threshold value in the control message that includes the two or more channel access threshold values 210 or may transmit the indication of the correlation/SNR threshold value in a separate control message. Additionally or alternatively, if base station 105-*a* is operating in full-duplex communications (e.g., base station 105-*a* is the full-duplex device), base station 105-*a* may identify or determine the correlation/SNR threshold value as part of the two or more channel access threshold values 210.

Subsequently, with the self-interference detection procedure, if the measured correlation/SNR is below a certain threshold (e.g., the correlation/SNR threshold value, the third threshold value, the self-interference threshold, etc.), the full-duplex device may determine that the detected energy on sensed resources (e.g., the channel) is not a result of the self-interference (e.g., and that the detected energy may be a result of other devices occupying the channel or sensed resources) and may refrain from transmitting on the sensed resources. Additionally or alternatively, if the measured correlation/SNR is greater that the threshold (e.g., the correlation/SNR threshold value, the third threshold value, the self-interference threshold, etc.), the full-duplex device may determine that the detected energy is a result of the self-interference (e.g., and that the detected energy is not a result of other devices occupying the channel or sensed resources) and may proceed with transmitting message 230 on the sensed resources (e.g., the full-duplex device is clear to send).

Figure 3:
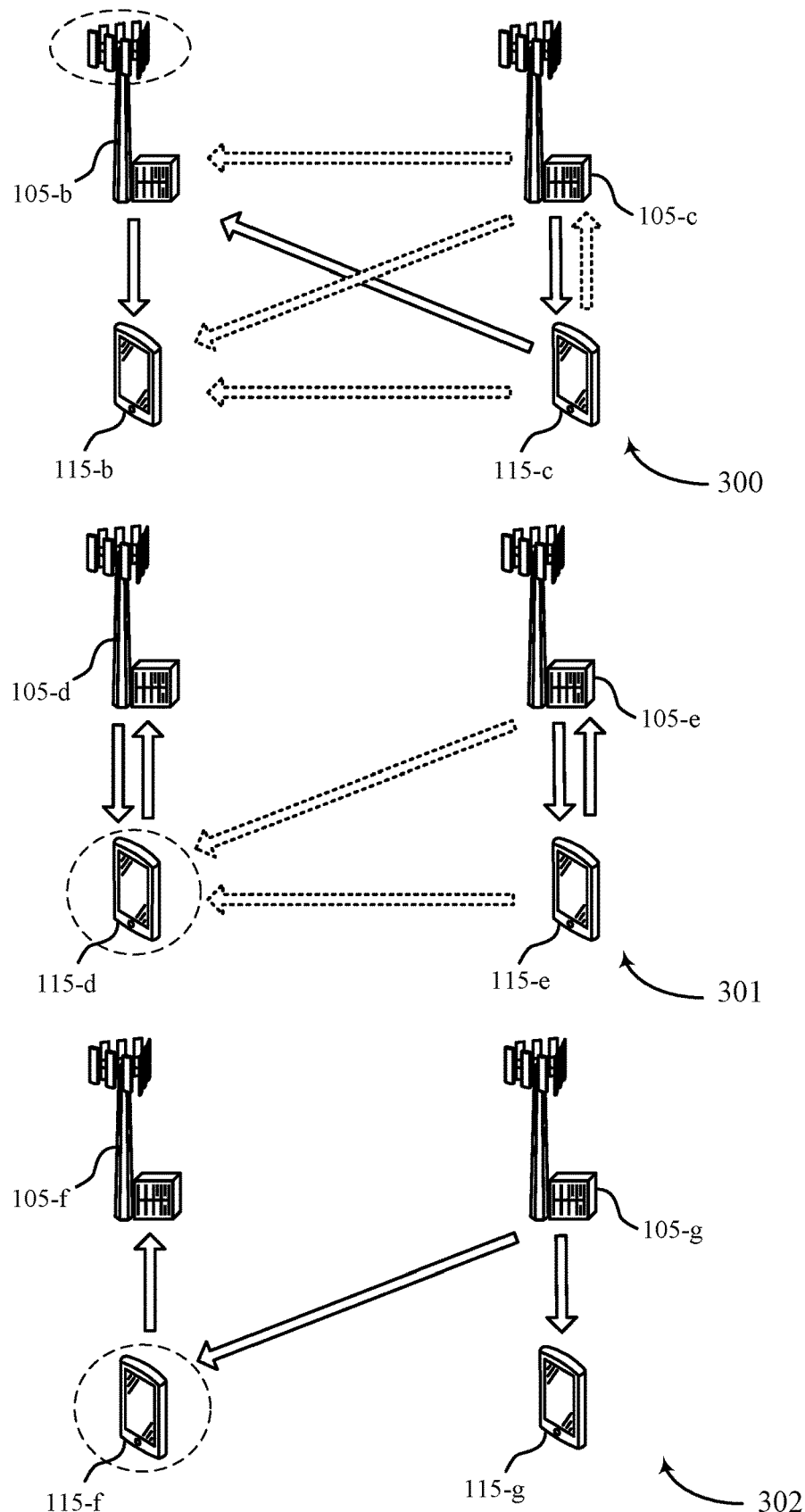

FIG. 3 illustrates examples of wireless communications systems 300, 301, and 302 that support multiple thresholds for unlicensed channel access for full-duplex nodes in accordance with aspects of the present disclosure. Wireless communications systems 300, 301, and 302 may implement aspects of or may be implemented by aspects of wireless communications system 100, wireless communications system 200, or both. For example, wireless communications systems 300, 301, and 302 may each include one or more UEs 115 and one or more base stations 105, which may be examples of UEs 115 and base stations 105 described with reference to FIGS. 1-2. Wireless communications systems 300, 301, and 302 may support half-duplex communications or full-duplex communications, or both.

Wireless communications systems 300, 301, and 302 may each show an example of self-interference either at a UE 115 or at a base station 105. In self-interference, a full-duplex device may experience interference from a signal which is communicated by the same full-duplex device (e.g., at a receiving or sensing side of the full-duplex device). For example, a transmission by a full-duplex device may interfere with reception at the full-duplex device, as energy propagated by antennas used for the transmission may reach antennas used for reception. In some cases, a full-duplex device may experience interference which may impact an LBT procedure performed at the full-duplex device. Although the full-duplex device may be capable of transmission and reception simultaneously, a first signal received by the full-duplex device may prevent the full-duplex device from gaining access to a channel to transmit a second signal.

In the example of wireless communications system 300, a base station 105-*b* may experience self-interference from downlink communications to uplink communications. For example, in wireless communications system 200, the base stations 105 may be configured for full-duplex communications, and the UEs 115 may be configured for half-duplex communications. In an example, base station 105-*b* may transmit downlink signaling to a UE 115-*b* using at least one antenna panel and receive uplink signaling from a UE 115-*c* using another antenna panel. This transmission of downlink signaling to UE 115-*b* at a same time as reception of uplink signaling from UE 115-*c* may cause self-interference at base station 105-*b*, as energy propagated from the transmitting antennas may interfere with the receiving antennas. Additionally or alternatively, base station 105-*b* may experience some interference from transmissions by a base station 105-*c*, such as base station-to-base station signaling or downlink signaling to a UE 115 (e.g., UE 115-*b* or UE 115-*c*). In some cases, signaling from UE 115-*c* (e.g., to the base stations 105 or to UE 115-*b* directly) may cause interference to the downlink reception at the UE 115-*b*.

In the example of wireless communications system 301, the base stations 105 and the UEs 115 may be configured for full-duplex communications. Wireless communications system 301 may show an example of uplink-to-downlink self-interference at a UE 115-*d*. For example, a base station 105-*d* may transmit downlink signaling to UE 115-*d*, which UE 115-*d* may receive via at least one antenna panel of UE 115-*d*. UE 115-*d* may also transmit uplink communications to base station 105-*d* via another antenna panel of UE 115-*d*. This concurrent receiving of downlink signaling and transmitting of uplink communications may cause self-interference at UE 115-*d*, as energy propagated from the transmitting antennas of UE 115-*d* may affect the antennas receiving the downlink signaling. Additionally or alternatively, downlink signaling from base station 105-*d* or transmission from a UE 115-*e* may cause interference at UE 115-*d* (e.g., interfering with receiving the downlink signaling from base station 105-*d*).

In the example of wireless communications system 302, a UE 115-*f* may be configured for full-duplex communications. UE 115-*f* may experience uplink-to-downlink self-interference. For example, UE 115-*f* may transmit uplink communications to a base station 105-*f*, as well as receive downlink communications from a base station 105-*g*. Base station 105-*g* may transmit downlink signaling to both UE 115-*f* and a UE 115-*g*. The simultaneous transmission and reception may cause self-interference at UE 115-*f*. For example, simultaneously transmitting the uplink signaling to base station 105-*f* and receiving the downlink signaling from base station 105-*g* may result in energy from the transmitting antennas interfering with the receiving antennas.

Some wireless communications systems may implement techniques to prevent self-interference. For example, a full-duplex device may use separate panels for transmission and reception, which may be located at different places on the device to mitigate interference. To prevent self-interference from disrupting an LBT procedure at a full-duplex device, the full-duplex device may implement techniques described herein. For example, a UE 115 and a base station 105 as described with reference to FIGS. 2 and 3 may implement techniques to determine whether self-interference is affecting a detected amount of energy from a channel access procedure based on using multiple threshold values configured for the channel access procedure.

Figure 4:
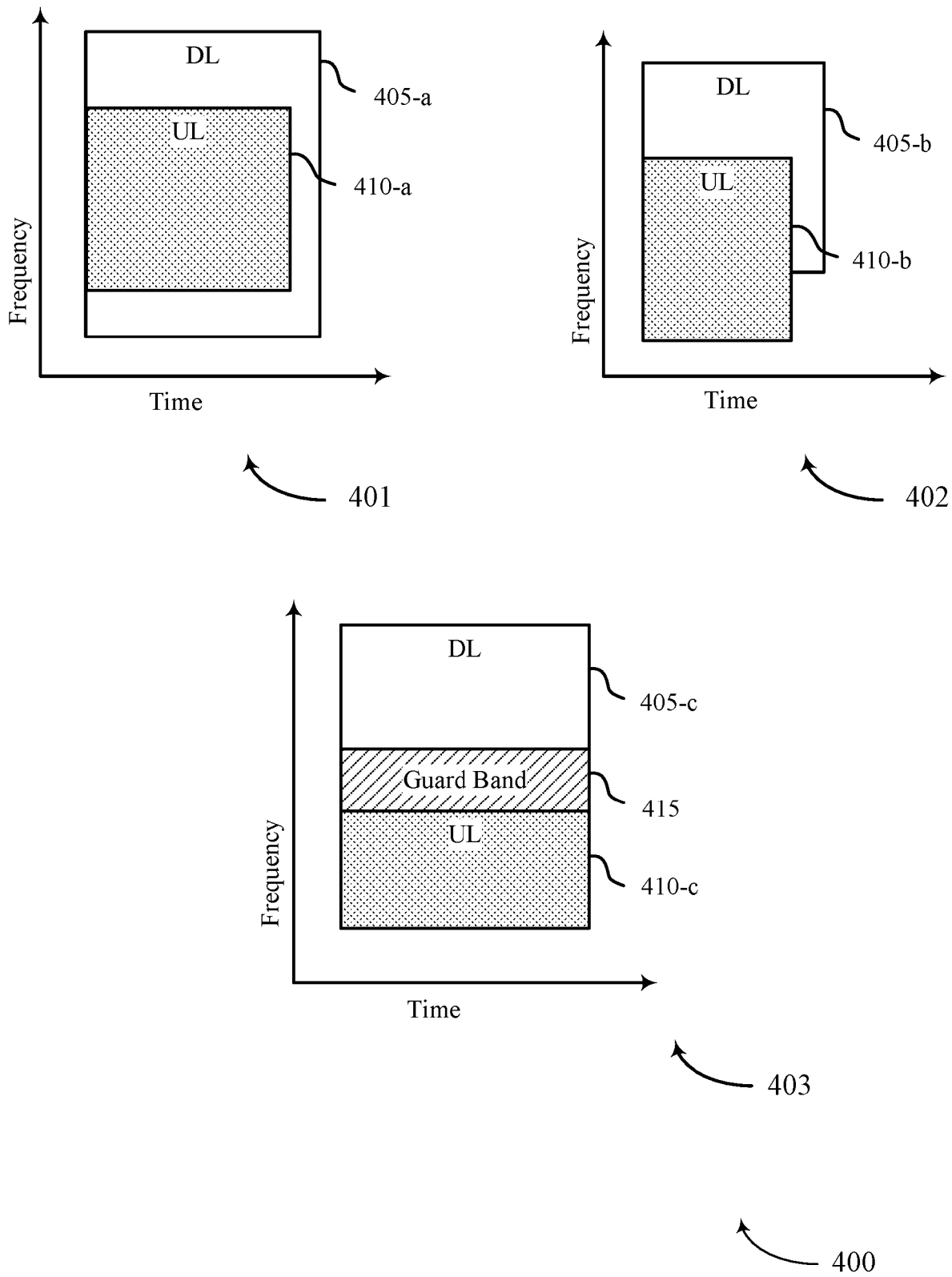
FIG. 4 illustrates examples of resource configurations in accordance with aspects of the present disclosure.

FIG. 4 illustrates an example of resource configurations 400 that support multiple thresholds for unlicensed channel access for full-duplex nodes in accordance with aspects of the present disclosure. The resource configurations 400 may implement aspects of or may be implemented by aspects of wireless communications system 100, wireless communications system 200, wireless communications system 300, wireless communications system 301, wireless communications system 302, or a combination thereof. For example, resource configurations 400 may illustrate resource allocations for wireless communications between a base station 105 and a UE 115 as described with reference to FIGS. 1-3. Resource configurations 400 may include a resource configuration 401, a resource configuration 402, and a resource configuration 403. Resource configurations 400, including resource configuration 401, resource configuration 402, and resource configuration 403 may be examples of resource configurations configured by the base station 105 according to a full-duplex capability of a device (e.g., a full-duplex device, such as a full-duplex UE 115, a full-duplex base station 105, etc.).

Resource configuration 401 may be an example of a fully overlapping IBFD resource allocation. For example, a base station 105 may allocate downlink resources 405-a and uplink resources 410-a for a UE 115 in overlapping frequency resources (e.g., uplink resources 410-a are fully contained within downlink resources 405-a). For example, downlink resources 405-a and uplink resources 410-a may overlap such that a UE 115 transmits and receives on the same time and frequency resources. In some cases, a UE 115 may receive an indication that downlink resources 405-a carry a downlink transmission that overlaps in time with an uplink transmission on uplink resources 410-a to the base station 105. Accordingly, the UE 115 may determine that the downlink transmissions are to be received in a high-interference environment and may decode the downlink transmission accordingly.

Resource configuration 402 may be an example of a partially overlapping IBFD resource allocation. For example, a base station 105 may allocate downlink resources 405-b and uplink resources 410-b for a UE 115 in partially overlapping time and frequency resources, such that the UE 115 and the base station 105 may transmit and receive on at least an overlapping portion of time and frequency resources. In some cases, other portions of downlink resources 405-b and uplink resources 410-b may not overlap in time or frequency, or both.

Resource configuration 403 may be an example of an SBFD resource allocation. For example, a base station 105 may allocate downlink resources 405-c and uplink resources 410-c for a UE 115 in separate frequency resources that occur during a same time period, such that the UE 115 and the base station 105 may transmit and receive over overlapping time resources and different frequency resources on the same radio frequency spectrum band. In some examples, downlink resources 405-c and uplink resources 410-c may be separated in frequency by a guard band 415. Guard band 415 may be, for example, one or a few RBs (e.g., five RBs) separating downlink resources 405-c and uplink resources 410-c in the frequency domain.

As described herein, a full-duplex device may perform a self-interference detection procedure when a detected amount of energy on a channel falls between a first configured threshold value and a second configured threshold value. As part of the self-interference detection procedure, the full-duplex device may perform a self-interference measurement (e.g., correlation measurement, SNR measurement, etc.) on signals transmitted by the full-duplex device as described with reference to FIG. 2. In some examples, the full-duplex device may perform the self-interference measurement based on a type of resource allocation configured for the full-duplex communications. For example, for IBFD operations (e.g., as shown in resource configuration 401 and resource configuration 402), the full-duplex device may perform the self-interference measurement directly on downlink resources 405 (e.g., sensing resources or a sensing band) from uplink resources 410 that overlap with those downlink resources 405. Additionally or alternatively, for SBFD operations (e.g., as shown in resource configuration 403), a non-linear interference may occur for downlink resources 405 (e.g., on sensing resources) and guard band 415, while a linear interference may occur near and for uplink resources 410, so the full-duplex device may perform the self-interference measurement for different kernels (e.g., a third and/or fifth degree kernel) of a transmitted signal based on those different kernels being strongest kernel(s) that interfere on downlink resources 405 (e.g., the sensing resources or sensing band).

A UE 115 and a base station 105 may use techniques described herein while communicating using an IBFD resource allocation or an SBFD resource allocation. For example, a UE 115 may be scheduled for a downlink transmission on downlink resources 405 and an uplink transmission on uplink resources 410. In some cases, the downlink resources 405 may span a greater duration on a least the time domain, such as being scheduled to start before the uplink resources 410. CCA resources for a CCA procedure (e.g., sensing resources) to transmit the uplink transmission on the uplink resources 410 may at least partially overlap with the scheduled downlink transmission. The UE 115 and the base station 105 may employ techniques described herein to determine whether self-interference affects detected amounts of energy on the CCA resources.

Figure 5:
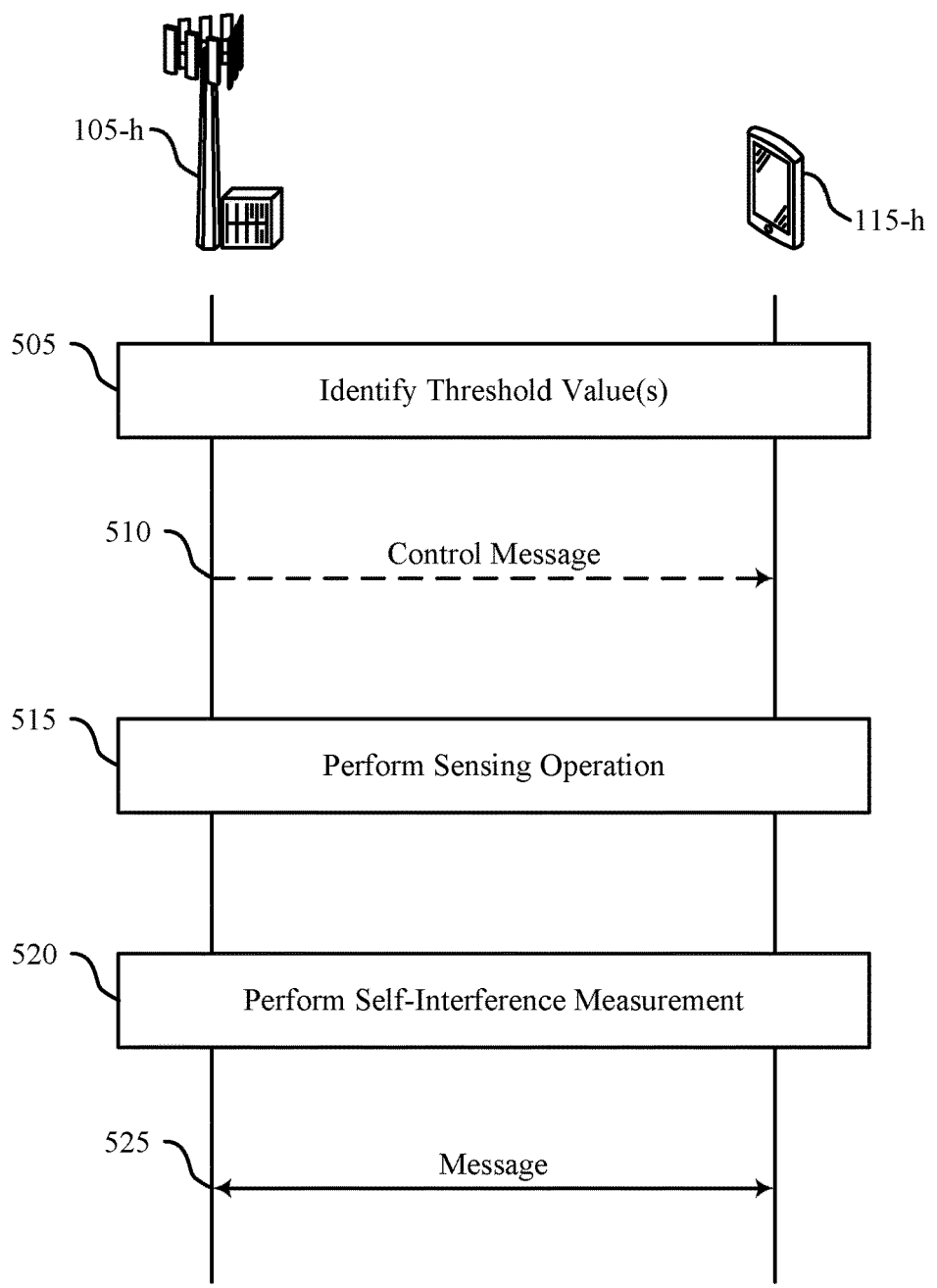
FIG. 5 illustrates an example of a process flow in accordance with aspects of the present disclosure.

FIG. 5 illustrates an example of a process flow 500 that supports multiple thresholds for unlicensed channel access for full-duplex nodes in accordance with aspects of the present disclosure. In some examples, process flow 500 may implement aspects of or may be implemented by aspects of wireless communications system 100, wireless communications system 200, or both. For example, process flow 500 may include a base station 105-h and a UE 115-h, which may represent examples of corresponding base stations 105 and UEs 115, respectively, as described with reference to FIGS. 1-4. In some examples, base station 105-h, UE 115-h, or both may be referred to as a full-duplex device, a full-duplex wireless device, a full-duplex node, or a similar type of device that support full-duplex communications.

In the following description of process flow 500, the operations between UE 115-h and base station 105-h may be performed in different orders or at different times. Certain operations may also be left out of process flow 500, or other operations may be added to process flow 500. It is to be understood that while UE 115-h and base station 105-h are shown performing a number of the operations of process flow 500, any device or wireless device may perform the operations shown.

At 505, a full-duplex device may identify a first threshold value and a second threshold value that exceeds the first threshold value for a channel access procedure on a shared channel and a self-interference threshold value for the channel access procedure. In some examples, the full-duplex device may be UE 115-h or base station 105-h (e.g., or an additional device supporting full-duplex communications).

At 510, the full-duplex device may receive a control message indicating the first threshold value, the second threshold value, the self-interference threshold value, or any combination thereof. For example, UE 115-h may receive, from base station 105-h, the control message indicating the first threshold value, the second threshold value, the self-interference threshold value, or any combination thereof.

At 515, the full-duplex device may perform a sensing operation for the channel access procedure to detect an amount of energy on the shared channel. In some examples, the full-duplex device may determine to transmit on the shared channel based on the amount of energy on the channel being below both the first threshold value and the second threshold value. Additionally or alternatively, the full-duplex device may determine to refrain from transmitting on the shared channel based on the amount of energy being above both the first threshold value and the second threshold value. In some examples, the amount of energy detected on the shared channel may include an amount of self-interference at the full-duplex device.

At 520, the full-duplex device may perform a self-interference measurement of a transmission from the full-duplex device (e.g., at a receiving or sensing side of the full-duplex device), where the self-interference measurement is performed based on the detected amount of energy on the shared channel occurring between the first threshold value and the second threshold value. In some examples, the full-duplex device may determine to transmit a message on the shared channel based on the self-interference measurement that is a correlation measurement generated using a signal transmitted from the full-duplex wireless device via the shared channel, where the message is determined to be transmitted on the shared channel based on the correlation measurement being above the self-interference threshold value. Additionally or alternatively, the full-duplex device may determine to refrain from transmitting the message on the shared channel based on the correlation measurement falling below the self-interference threshold value. In some examples, the self-interference measurement or correlation measurement may include an SNR measurement.

At 525, the full-duplex device may transmit the message via the shared channel based on the self-interference measurement exceeding the self-interference threshold value. For example, base station 105-h may receive, from UE 115-h, the message on the shared channel based on the first threshold value, the second threshold value, and the self-interference threshold value. In some examples, base station 105-h may receive the message on the shared channel based on the detected amount of energy on the shared channel being below both the first threshold value and the second threshold value. Additionally or alternatively, base station 105-h may receive the message on the shared channel based on the detected amount of energy on the shared channel occurring between the first threshold value and the second threshold value and the correlation measurement satisfying the self-interference threshold value.

Figure 6:
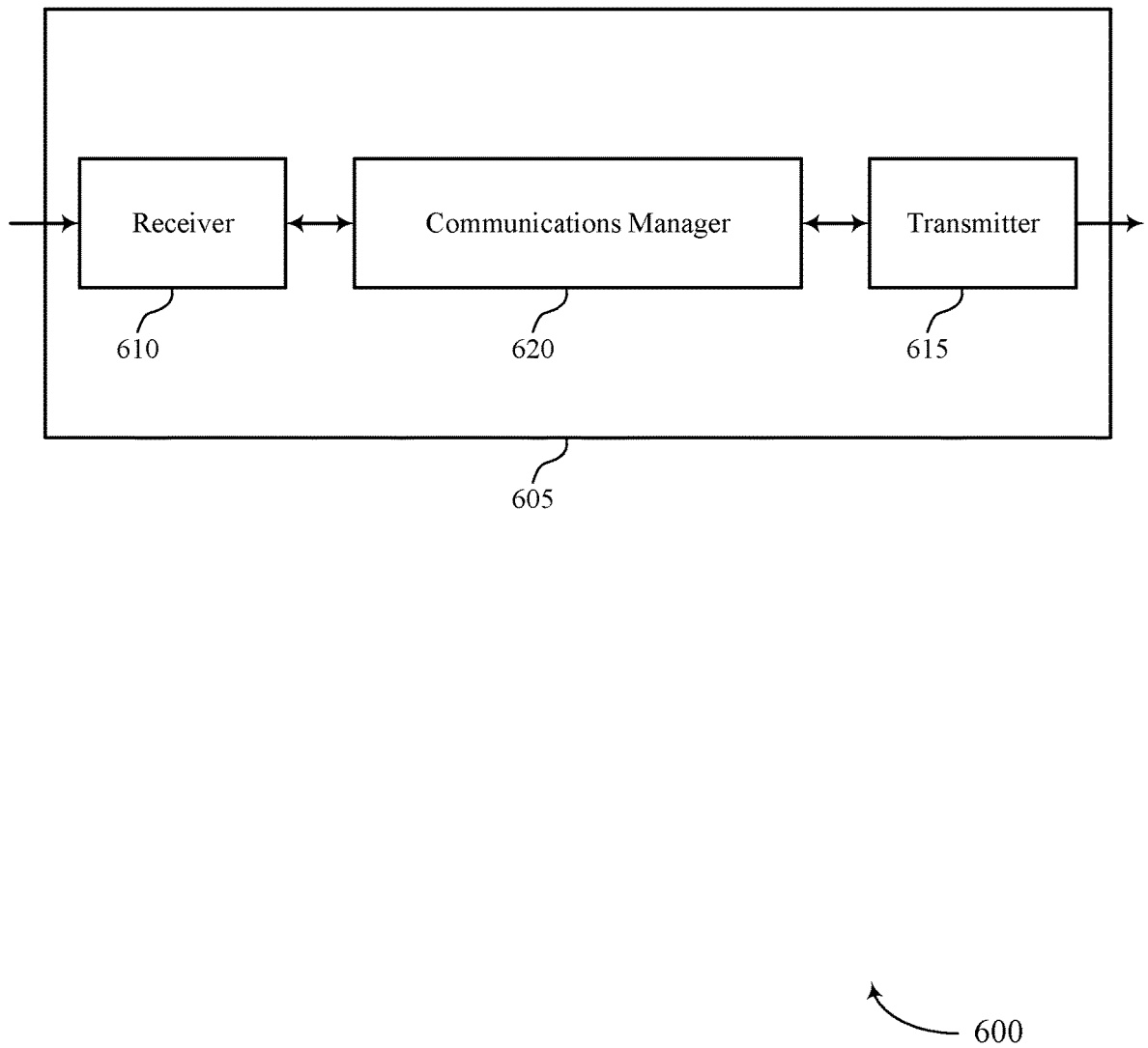
FIGS. 6 and 7 show block diagrams of devices in accordance with aspects of the present disclosure.

FIG. 6 shows a block diagram 600 of a device 605 that supports multiple thresholds for unlicensed channel access for full-duplex nodes in accordance with aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to multiple thresholds for unlicensed channel access for full-duplex nodes). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to multiple thresholds for unlicensed channel access for full-duplex nodes). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of multiple thresholds for unlicensed channel access for full-duplex nodes as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a full-duplex wireless device in accordance with examples as disclosed herein. For example, the communications manager 620 may be configured as or otherwise support a means for identifying a first threshold value and a second threshold value that exceeds the first threshold value for a channel access procedure on a shared channel and a self-interference threshold value for the channel access procedure. The communications manager 620 may be configured as or otherwise support a means for performing a first sensing operation for the channel access procedure to detect a first amount of energy on the shared channel. The communications manager 620 may be configured as or otherwise support a means for performing a self-interference measurement of a transmission from the full-duplex wireless device, the self-interference measurement being performed based on the first amount of energy on the shared channel occurring between the first threshold value and the second threshold value. The communications manager 620 may be configured as or otherwise support a means for transmitting a message via the shared channel based on the self-interference measurement exceeding the self-interference threshold value.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for reduced latency. For example, based on using the first threshold value, the second threshold value, and the self-interference threshold value, the device 605 may perform an enhanced channel access procedure that accounts for self-interference at the device 605. Accordingly, the device 605 may reduce a latency when attempting to access a shared channel based on having a higher likelihood that the channel access procedure does not fail due to self-interference and being able to transmit with less latency.

Figure 7:
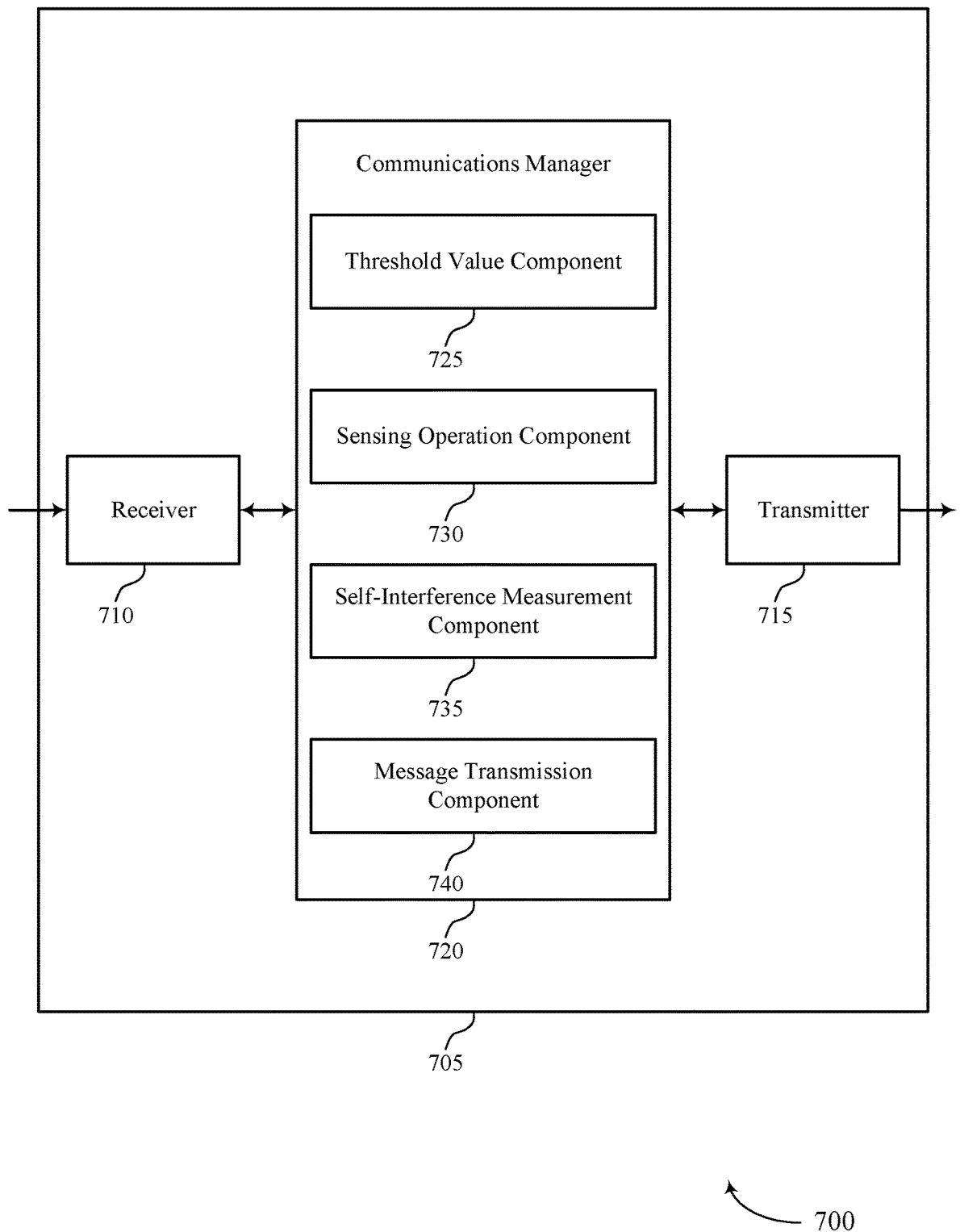

FIG. 7 shows a block diagram 700 of a device 705 that supports multiple thresholds for unlicensed channel access for full-duplex nodes in accordance with aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to multiple thresholds for unlicensed channel access for full-duplex nodes). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to multiple thresholds for unlicensed channel access for full-duplex nodes). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of multiple thresholds for unlicensed channel access for full-duplex nodes as described herein. For example, the communications manager 720 may include a threshold value component 725, a sensing operation component 730, a self-interference measurement component 735, a message transmission component 740, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communications at a full-duplex wireless device in accordance with examples as disclosed herein. The threshold value component 725 may be configured as or otherwise support a means for identifying a first threshold value and a second threshold value that exceeds the first threshold value for a channel access procedure on a shared channel and a self-interference threshold value for the channel access procedure. The sensing operation component 730 may be configured as or otherwise support a means for performing a first sensing operation for the channel access procedure to detect a first amount of energy on the shared channel. The self-interference measurement component 735 may be configured as or otherwise support a means for performing a self-interference measurement of a transmission from the full-duplex wireless device, the self-interference measurement being performed based on the first amount of energy on the shared channel occurring between the first threshold value and the second threshold value. The message transmission component 740 may be configured as or otherwise support a means for transmitting a message via the shared channel based on the self-interference measurement exceeding the self-interference threshold value.

Figure 8:
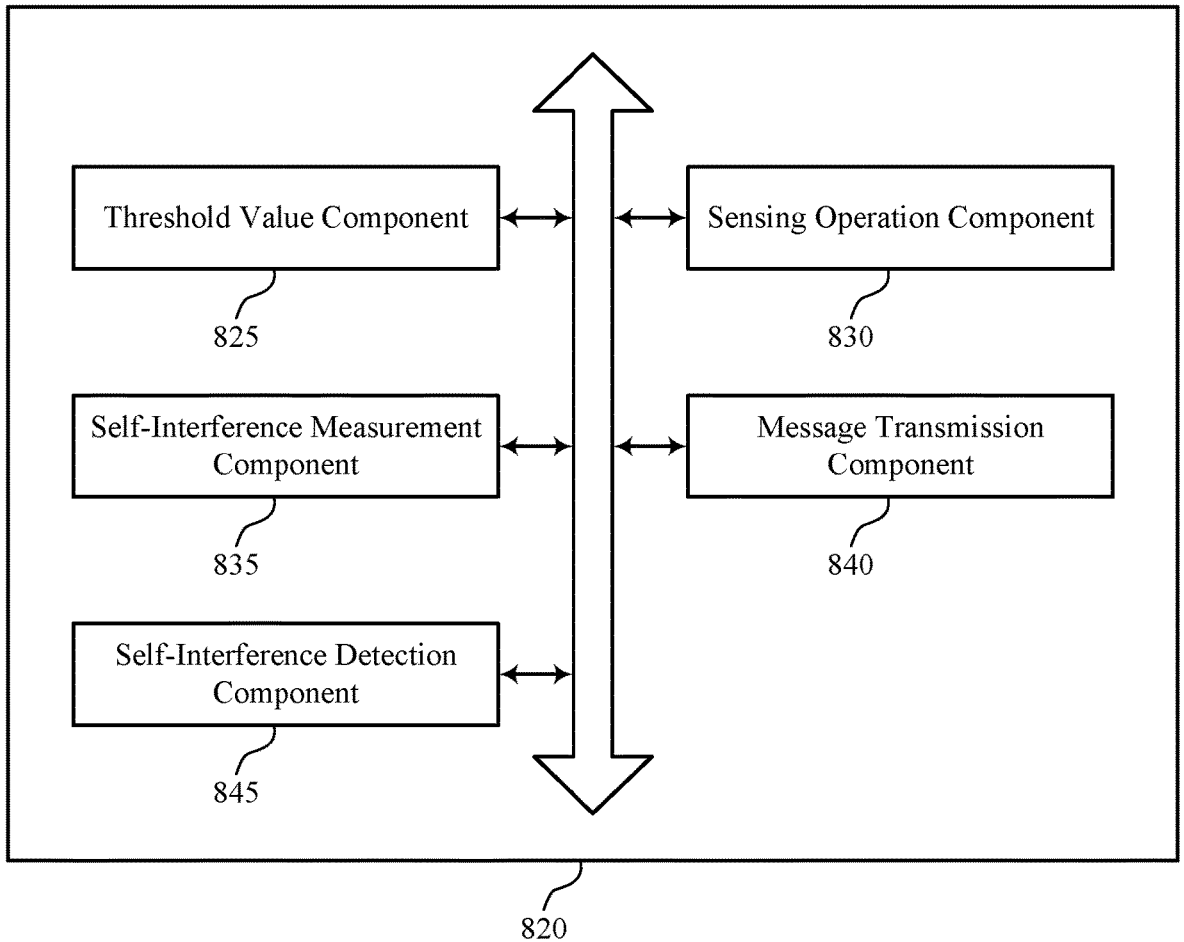
FIG. 8 shows a block diagram of a communications manager in accordance with aspects of the present disclosure.

FIG. 8 shows a block diagram 800 of a communications manager 820 that supports multiple thresholds for unlicensed channel access for full-duplex nodes in accordance with aspects of the present disclosure. The communications manager 820 may be an example of aspects of a communications manager 620, a communications manager 720, or both, as described herein. The communications manager 820, or various components thereof, may be an example of means for performing various aspects of multiple thresholds for unlicensed channel access for full-duplex nodes as described herein. For example, the communications manager 820 may include a threshold value component 825, a sensing operation component 830, a self-interference measurement component 835, a message transmission component 840, a self-interference detection component 845, or any combination thereof. Each of these components may communicate, directly or indirectly, with one another (e.g., via one or more buses).

The communications manager 820 may support wireless communications at a full-duplex wireless device in accordance with examples as disclosed herein. The threshold value component 825 may be configured as or otherwise support a means for identifying a first threshold value and a second threshold value that exceeds the first threshold value for a channel access procedure on a shared channel and a self-interference threshold value for the channel access procedure. The sensing operation component 830 may be configured as or otherwise support a means for performing a first sensing operation for the channel access procedure to detect a first amount of energy on the shared channel. The self-interference measurement component 835 may be configured as or otherwise support a means for performing a self-interference measurement of a transmission from the full-duplex wireless device, the self-interference measurement being performed based on the first amount of energy on the shared channel occurring between the first threshold value and the second threshold value. The message transmission component 840 may be configured as or otherwise support a means for transmitting a message via the shared channel based on the self-interference measurement exceeding the self-interference threshold value.

In some examples, to support identifying the first threshold value, the second threshold value, and the self-interference threshold value, the threshold value component 825 may be configured as or otherwise support a means for receiving, from a base station, a control message indicating the first threshold value, the second threshold value, the self-interference threshold value, or any combination thereof.

In some examples, the sensing operation component 830 may be configured as or otherwise support a means for performing a second sensing operation for the channel access procedure to sense a second amount of energy on the shared channel. In some examples, the sensing operation component 830 may be configured as or otherwise support a means for transmitting a second message on the shared channel based on the second amount of energy on the shared channel being below both the first threshold value and the second threshold value.

In some examples, to support transmitting the message, the self-interference detection component 845 may be configured as or otherwise support a means for transmitting the message on the shared channel based on the self-interference measurement that is a correlation measurement generated using a signal transmitted from the full-duplex wireless device via the shared channel.

In some examples, to support transmitting the message on the shared channel, the self-interference detection component 845 may be configured as or otherwise support a means for transmitting the message on the shared channel based on the correlation measurement being above the self-interference threshold value. In some examples, the self-interference measurement is a signal-to-noise ratio measurement.

In some examples, the self-interference detection component 845 may be configured as or otherwise support a means for refraining from transmitting on the shared channel based on the self-interference measurement that is a correlation measurement generated using a signal transmitted from the full-duplex wireless device via the shared channel.

In some examples, the self-interference detection component 845 may be configured as or otherwise support a means for refraining from transmitting on the shared channel based on the correlation measurement falling below the self-interference threshold value. In some examples, the correlation measurement includes a signal-to-noise ratio measurement.

In some examples, the sensing operation component 830 may be configured as or otherwise support a means for performing a second sensing operation for the channel access procedure to sense a second amount of energy on the shared channel. In some examples, the sensing operation component 830 may be configured as or otherwise support a means for refraining from transmitting on the shared channel based on the second amount of energy being above both the first threshold value and the second threshold value.

In some examples, the first amount of energy detected on the shared channel includes an amount of self-interference at the full-duplex wireless device. In some examples, the full-duplex wireless device is a user equipment or a base station.

Figure 9:
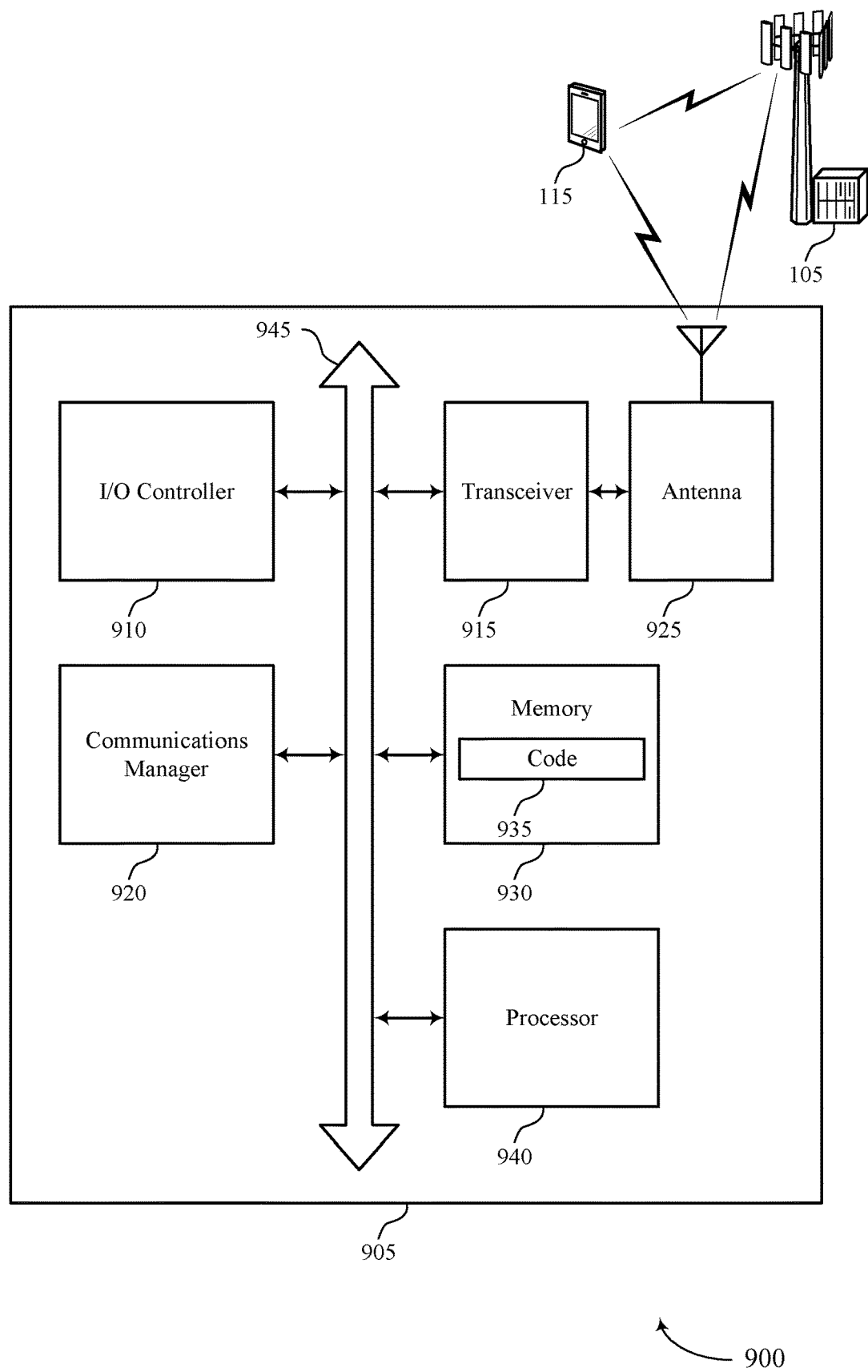
FIG. 9 shows a diagram of a system including a device in accordance with aspects of the present disclosure.

FIG. 9 shows a diagram of a system 900 including a device 905 that supports multiple thresholds for unlicensed channel access for full-duplex nodes in accordance with aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting multiple thresholds for unlicensed channel access for full-duplex nodes). For example, the device 905 or a component of the device 905 may include a processor 940 and memory 930 coupled to the processor 940, the processor 940 and memory 930 configured to perform various functions described herein.

The communications manager 920 may support wireless communications at a full-duplex wireless device in accordance with examples as disclosed herein. For example, the communications manager 920 may be configured as or otherwise support a means for identifying a first threshold value and a second threshold value that exceeds the first threshold value for a channel access procedure on a shared channel and a self-interference threshold value for the channel access procedure. The communications manager 920 may be configured as or otherwise support a means for performing a first sensing operation for the channel access procedure to detect a first amount of energy on the shared channel. The communications manager 920 may be configured as or otherwise support a means for performing a self-interference measurement of a transmission from the full-duplex wireless device, the self-interference measurement being performed based on the first amount of energy on the shared channel occurring between the first threshold value and the second threshold value. The communications manager 920 may be configured as or otherwise support a means for transmitting a message via the shared channel based on the self-interference measurement exceeding the self-interference threshold value.

By including or configuring the communications manager 920 in accordance with examples as described herein, the device 905 may support techniques for improved communication reliability, reduced latency, and improved utilization of processing capability. For example, based on using the first threshold value, the second threshold value, and the self-interference threshold value, the device 905 may perform an enhanced channel access procedure that accounts for self-interference at the device 905. Accordingly, the device 905 may reduce a latency, improve communication reliability, and improve utilization of processing capabilities when attempting to access a shared channel based on having a higher likelihood that the channel access procedure does not fail due to self-interference or subsequent communications are not affected by the self-interference.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of multiple thresholds for unlicensed channel access for full-duplex nodes as described herein, or the processor 940 and the memory 930 may be otherwise configured to perform or support such operations.

Figure 10:
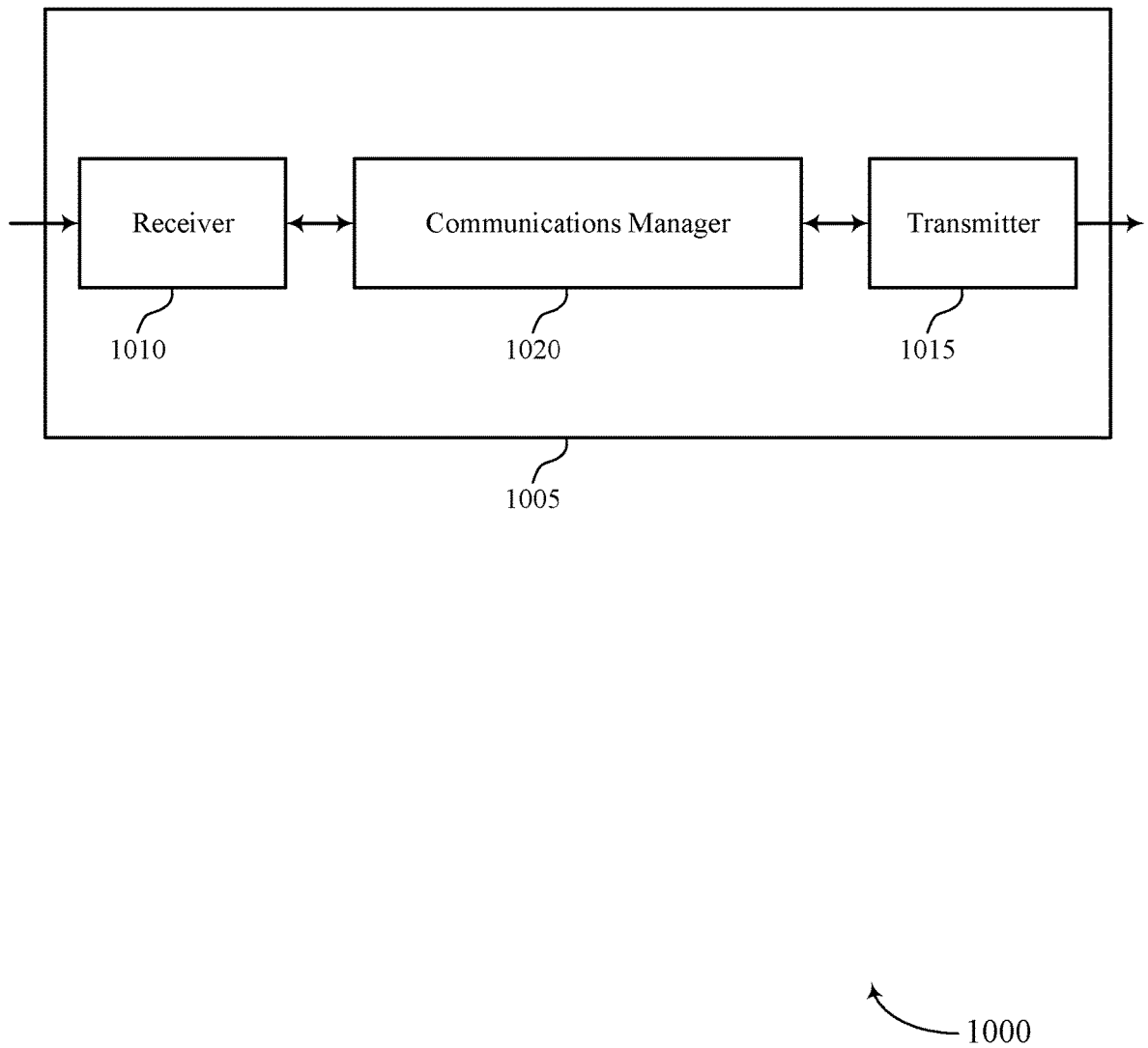
FIGS. 10 and 11 show block diagrams of devices in accordance with aspects of the present disclosure.

FIG. 10 shows a block diagram 1000 of a device 1005 that supports multiple thresholds for unlicensed channel access for full-duplex nodes in accordance with aspects of the present disclosure. The device 1005 may be an example of aspects of a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to multiple thresholds for unlicensed channel access for full-duplex nodes). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to multiple thresholds for unlicensed channel access for full-duplex nodes). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of multiple thresholds for unlicensed channel access for full-duplex nodes as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry).

The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1020 may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at a full-duplex wireless device in accordance with examples as disclosed herein. For example, the communications manager 1020 may be configured as or otherwise support a means for identifying a first threshold value and a second threshold value that exceeds the first threshold value for a channel access procedure on a shared channel and a self-interference threshold value for the channel access procedure. The communications manager 1020 may be configured as or otherwise support a means for performing a first sensing operation for the channel access procedure to detect a first amount of energy on the shared channel. The communications manager 1020 may be configured as or otherwise support a means for performing a self-interference measurement of a transmission from the full-duplex wireless device, the self-interference measurement being performed based on the first amount of energy on the shared channel occurring between the first threshold value and the second threshold value. The communications manager 1020 may be configured as or otherwise support a means for transmitting a message via the shared channel based on the self-interference measurement exceeding the self-interference threshold value.

Additionally or alternatively, the communications manager 1020 may support wireless communications at a base station in accordance with examples as disclosed herein. For example, the communications manager 1020 may be configured as or otherwise support a means for transmitting, to a UE, a control message indicating a first threshold value and a second threshold value that exceeds the first threshold value for a channel access procedure, and indicating a self-interference threshold value for the channel access procedure for performing a self-interference measurement when a detected amount of energy of a shared channel occurs between the first threshold value and the second threshold value. The communications manager 1020 may be configured as or otherwise support a means for receiving, from the UE, a message on the shared channel based on the first threshold value, the second threshold value, and the self-interference threshold value.

Figure 11:
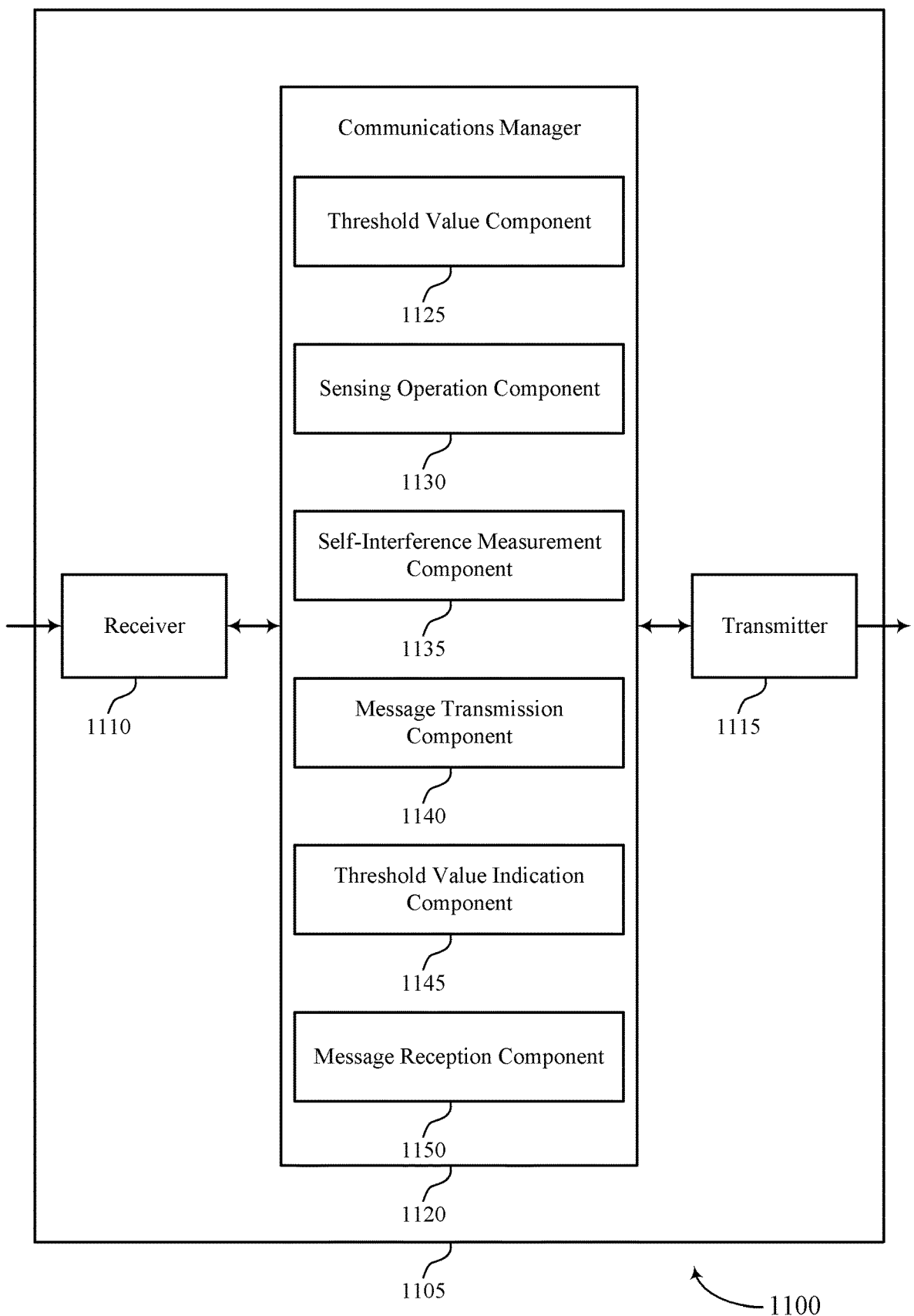

FIG. 11 shows a block diagram 1100 of a device 1105 that supports multiple thresholds for unlicensed channel access for full-duplex nodes in accordance with aspects of the present disclosure. The device 1105 may be an example of aspects of a device 1005 or a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to multiple thresholds for unlicensed channel access for full-duplex nodes). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to multiple thresholds for unlicensed channel access for full-duplex nodes). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of multiple thresholds for unlicensed channel access for full-duplex nodes as described herein. For example, the communications manager 1120 may include a threshold value component 1125, a sensing operation component 1130, a self-interference measurement component 1135, a message transmission component 1140, a threshold value indication component 1145, a message reception component 1150, or any combination thereof. The communications manager 1120 may be an example of aspects of a communications manager 1020 as described herein. In some examples, the communications manager 1120, or various components thereof, may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communications at a full-duplex wireless device in accordance with examples as disclosed herein. The threshold value component 1125 may be configured as or otherwise support a means for identifying a first threshold value and a second threshold value that exceeds the first threshold value for a channel access procedure on a shared channel and a self-interference threshold value for the channel access procedure. The sensing operation component 1130 may be configured as or otherwise support a means for performing a first sensing operation for the channel access procedure to detect a first amount of energy on the shared channel. The self-interference measurement component 1135 may be configured as or otherwise support a means for performing a self-interference measurement of a transmission from the full-duplex wireless device, the self-interference measurement being performed based on the first amount of energy on the shared channel occurring between the first threshold value and the second threshold value. The message transmission component 1140 may be configured as or otherwise support a means for transmitting a message via the shared channel based on the self-interference measurement exceeding the self-interference threshold value.

Additionally or alternatively, the communications manager 1120 may support wireless communications at a base station in accordance with examples as disclosed herein. The threshold value indication component 1145 may be configured as or otherwise support a means for transmitting, to a UE, a control message indicating a first threshold value and a second threshold value that exceeds the first threshold value for a channel access procedure, and indicating a self-interference threshold value for the channel access procedure for performing a self-interference measurement when a detected amount of energy of a shared channel occurs between the first threshold value and the second threshold value. The message reception component 1150 may be configured as or otherwise support a means for receiving, from the UE, a message on the shared channel based on the first threshold value, the second threshold value, and the self-interference threshold value.

Figure 12:
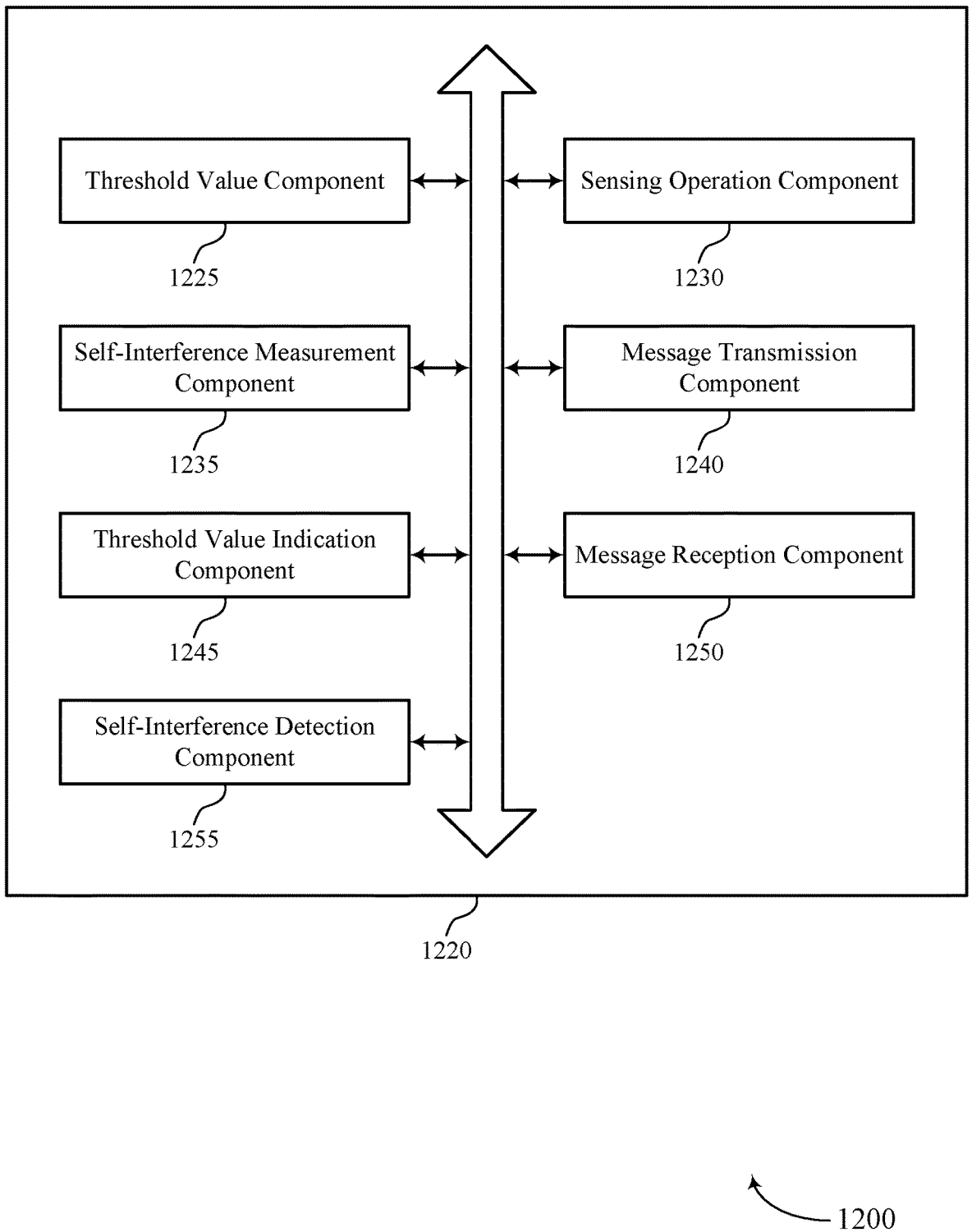
FIG. 12 shows a block diagram of a communications manager in accordance with aspects of the present disclosure.

FIG. 12 shows a block diagram 1200 of a communications manager 1220 that supports multiple thresholds for unlicensed channel access for full-duplex nodes in accordance with aspects of the present disclosure. The communications manager 1220 may be an example of aspects of a communications manager 1020, a communications manager 1120, or both, as described herein. The communications manager 1220, or various components thereof, may be an example of means for performing various aspects of multiple thresholds for unlicensed channel access for full-duplex nodes as described herein. For example, the communications manager 1220 may include a threshold value component 1225, a sensing operation component 1230, a self-interference measurement component 1235, a message transmission component 1240, a threshold value indication component 1245, a message reception component 1250, a self-interference detection component 1255, or any combination thereof. Each of these components may communicate, directly or indirectly, with one another (e.g., via one or more buses).

The communications manager 1220 may support wireless communications at a full-duplex wireless device in accordance with examples as disclosed herein. The threshold value component 1225 may be configured as or otherwise support a means for identifying a first threshold value and a second threshold value that exceeds the first threshold value for a channel access procedure on a shared channel and a self-interference threshold value for the channel access procedure. The sensing operation component 1230 may be configured as or otherwise support a means for performing a first sensing operation for the channel access procedure to detect a first amount of energy on the shared channel. The self-interference measurement component 1235 may be configured as or otherwise support a means for performing a self-interference measurement of a transmission from the full-duplex wireless device, the self-interference measurement being performed based on the first amount of energy on the shared channel occurring between the first threshold value and the second threshold value. The message transmission component 1240 may be configured as or otherwise support a means for transmitting a message via the shared channel based on the self-interference measurement exceeding the self-interference threshold value.

In some examples, to support identifying the first threshold value, the second threshold value, and the self-interference threshold value, the threshold value component 1225 may be configured as or otherwise support a means for receiving, from a base station, a control message indicating the first threshold value, the second threshold value, the self-interference threshold value, or any combination thereof.

In some examples, the sensing operation component 1230 may be configured as or otherwise support a means for performing a second sensing operation for the channel access procedure to sense a second amount of energy on the shared channel. In some examples, the sensing operation component 1230 may be configured as or otherwise support a means for transmitting a second message on the shared channel based on the second amount of energy on the shared channel being below both the first threshold value and the second threshold value.

In some examples, to support transmitting the message, the self-interference detection component 1255 may be configured as or otherwise support a means for transmitting the message on the shared channel based on the self-interference measurement that is a correlation measurement generated using a signal transmitted from the full-duplex wireless device via the shared channel.

In some examples, to support transmitting the message on the shared channel, the self-interference detection component 1255 may be configured as or otherwise support a means for transmitting the message on the shared channel based on the correlation measurement being above the self-interference threshold value. In some examples, the self-interference measurement is a signal-to-noise ratio measurement.

In some examples, the self-interference detection component 1255 may be configured as or otherwise support a means for refraining from transmitting on the shared channel based on the self-interference measurement that is a correlation measurement generated using a signal transmitted from the full-duplex wireless device via the shared channel.

In some examples, the self-interference detection component 1255 may be configured as or otherwise support a means for refraining from transmitting on the shared channel based on the correlation measurement falling below the self-interference threshold value. In some examples, the correlation measurement includes a signal-to-noise ratio measurement.

In some examples, the sensing operation component 1230 may be configured as or otherwise support a means for performing a second sensing operation for the channel access procedure to sense a second amount of energy on the shared channel. In some examples, the sensing operation component 1230 may be configured as or otherwise support a means for refraining from transmitting on the shared channel based on the second amount of energy being above both the first threshold value and the second threshold value.

In some examples, the first amount of energy detected on the shared channel includes an amount of self-interference at the full-duplex wireless device. In some examples, the full-duplex wireless device is a user equipment or a base station.

Additionally or alternatively, the communications manager 1220 may support wireless communications at a base station in accordance with examples as disclosed herein. The threshold value indication component 1245 may be configured as or otherwise support a means for transmitting, to a UE, a control message indicating a first threshold value and a second threshold value that exceeds the first threshold value for a channel access procedure, and indicating a self-interference threshold value for the channel access procedure for performing a self-interference measurement when a detected amount of energy of a shared channel occurs between the first threshold value and the second threshold value. The message reception component 1250 may be configured as or otherwise support a means for receiving, from the UE, a message on the shared channel based on the first threshold value, the second threshold value, and the self-interference threshold value.

In some examples, to support receiving the message on the shared channel, the message reception component 1250 may be configured as or otherwise support a means for receiving the message on the shared channel based on a detected amount of energy on the shared channel being below both the first threshold value and the second threshold value.

In some examples, to support receiving the message on the shared channel, the message reception component 1250 may be configured as or otherwise support a means for receiving the message on the shared channel based on a detected amount of energy on the shared channel occurring between the first threshold value and the second threshold value and a correlation measurement satisfying the self-interference threshold value. In some examples, the correlation measurement includes the self-interference measurement, a signal-to-noise ratio measurement, or a combination thereof.

Figure 13:
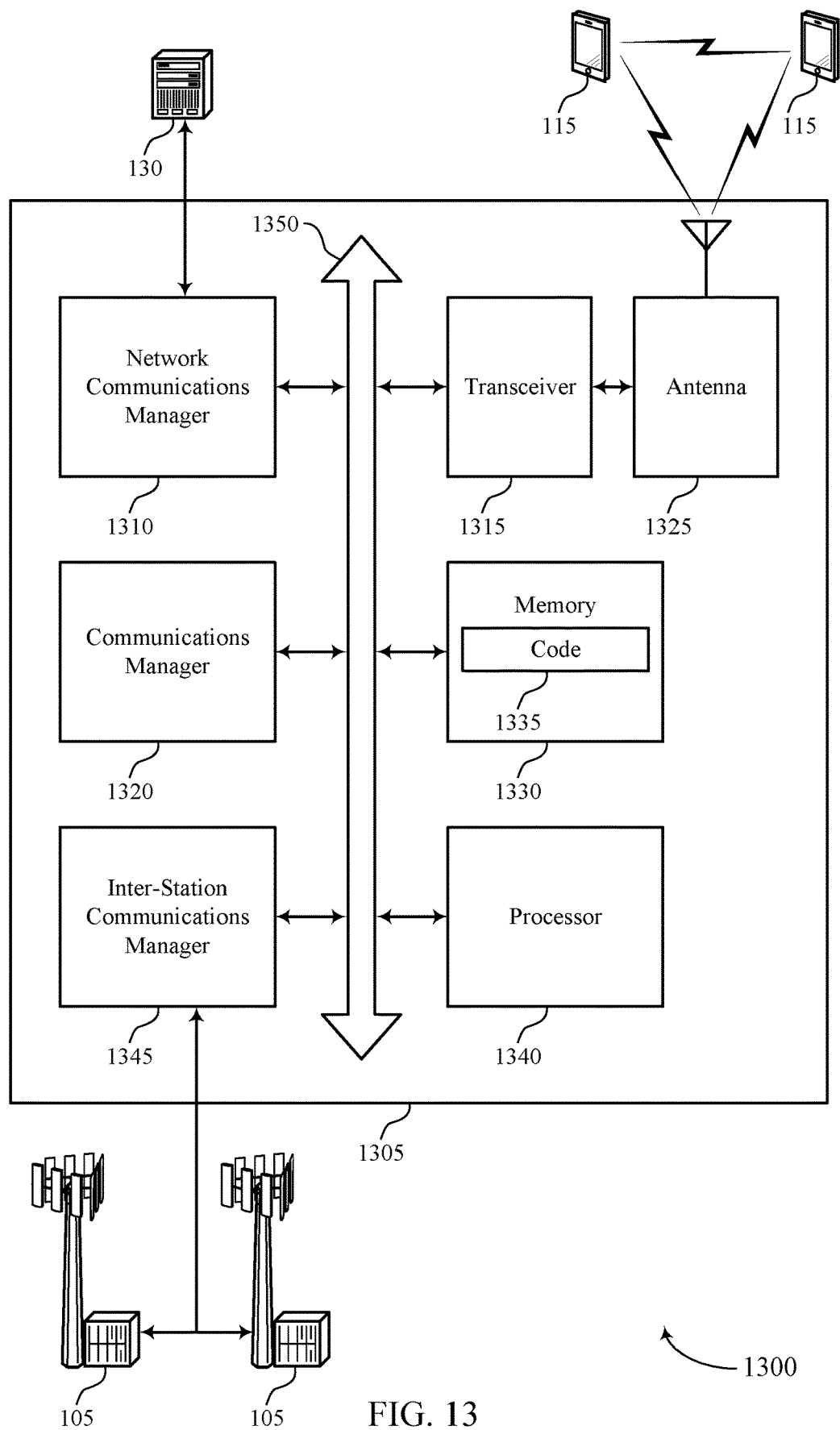
FIG. 13 shows a diagram of a system including a device in accordance with aspects of the present disclosure.

FIG. 13 shows a diagram of a system 1300 including a device 1305 that supports multiple thresholds for unlicensed channel access for full-duplex nodes in accordance with aspects of the present disclosure. The device 1305 may be an example of or include the components of a device 1005, a device 1105, or a base station 105 as described herein. The device 1305 may communicate wirelessly with one or more base stations 105, UEs 115, or any combination thereof. The device 1305 may include components for bi-directional voice and data communications including components for transmitting and receiving communications, such as a communications manager 1320, a network communications manager 1310, a transceiver 1315, an antenna 1325, a memory 1330, code 1335, a processor 1340, and an inter-station communications manager 1345. These components may be in electronic communication or otherwise coupled (e.g., operatively, communicatively, functionally, electronically, electrically) via one or more buses (e.g., a bus 1350).

The network communications manager 1310 may manage communications with a core network 130 (e.g., via one or more wired backhaul links). For example, the network communications manager 1310 may manage the transfer of data communications for client devices, such as one or more UEs 115.

In some cases, the device 1305 may include a single antenna 1325. However, in some other cases the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The memory 1330 may include RAM and ROM. The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory. In some cases, the code 1335 may not be directly executable by the processor 1340 but may cause a computer (e.g., when compiled and executed) to perform functions described herein. In some cases, the memory 1330 may contain, among other things, a BIOS which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting multiple thresholds for unlicensed channel access for full-duplex nodes). For example, the device 1305 or a component of the device 1305 may include a processor 1340 and memory 1330 coupled to the processor 1340, the processor 1340 and memory 1330 configured to perform various functions described herein.

The inter-station communications manager 1345 may manage communications with other base stations 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communications network technology to provide communication between base stations 105.

The communications manager 1320 may support wireless communications at a full-duplex wireless device in accordance with examples as disclosed herein. For example, the communications manager 1320 may be configured as or otherwise support a means for identifying a first threshold value and a second threshold value that exceeds the first threshold value for a channel access procedure on a shared channel and a self-interference threshold value for the channel access procedure. The communications manager 1320 may be configured as or otherwise support a means for performing a first sensing operation for the channel access procedure to detect a first amount of energy on the shared channel. The communications manager 1320 may be configured as or otherwise support a means for performing a self-interference measurement of a transmission from the full-duplex wireless device, the self-interference measurement being performed based on the first amount of energy on the shared channel occurring between the first threshold value and the second threshold value. The communications manager 1320 may be configured as or otherwise support a means for transmitting a message via the shared channel based on the self-interference measurement exceeding the self-interference threshold value.

Additionally or alternatively, the communications manager 1320 may support wireless communications at a base station in accordance with examples as disclosed herein. For example, the communications manager 1320 may be configured as or otherwise support a means for transmitting, to a UE, a control message indicating a first threshold value and a second threshold value that exceeds the first threshold value for a channel access procedure, and indicating a self-interference threshold value for the channel access procedure for performing a self-interference measurement when a detected amount of energy of a shared channel occurs between the first threshold value and the second threshold value. The communications manager 1320 may be configured as or otherwise support a means for receiving, from the UE, a message on the shared channel based on the first threshold value, the second threshold value, and the self-interference threshold value.

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of multiple thresholds for unlicensed channel access for full-duplex nodes as described herein, or the processor 1340 and the memory 1330 may be otherwise configured to perform or support such operations.

Figure 14:
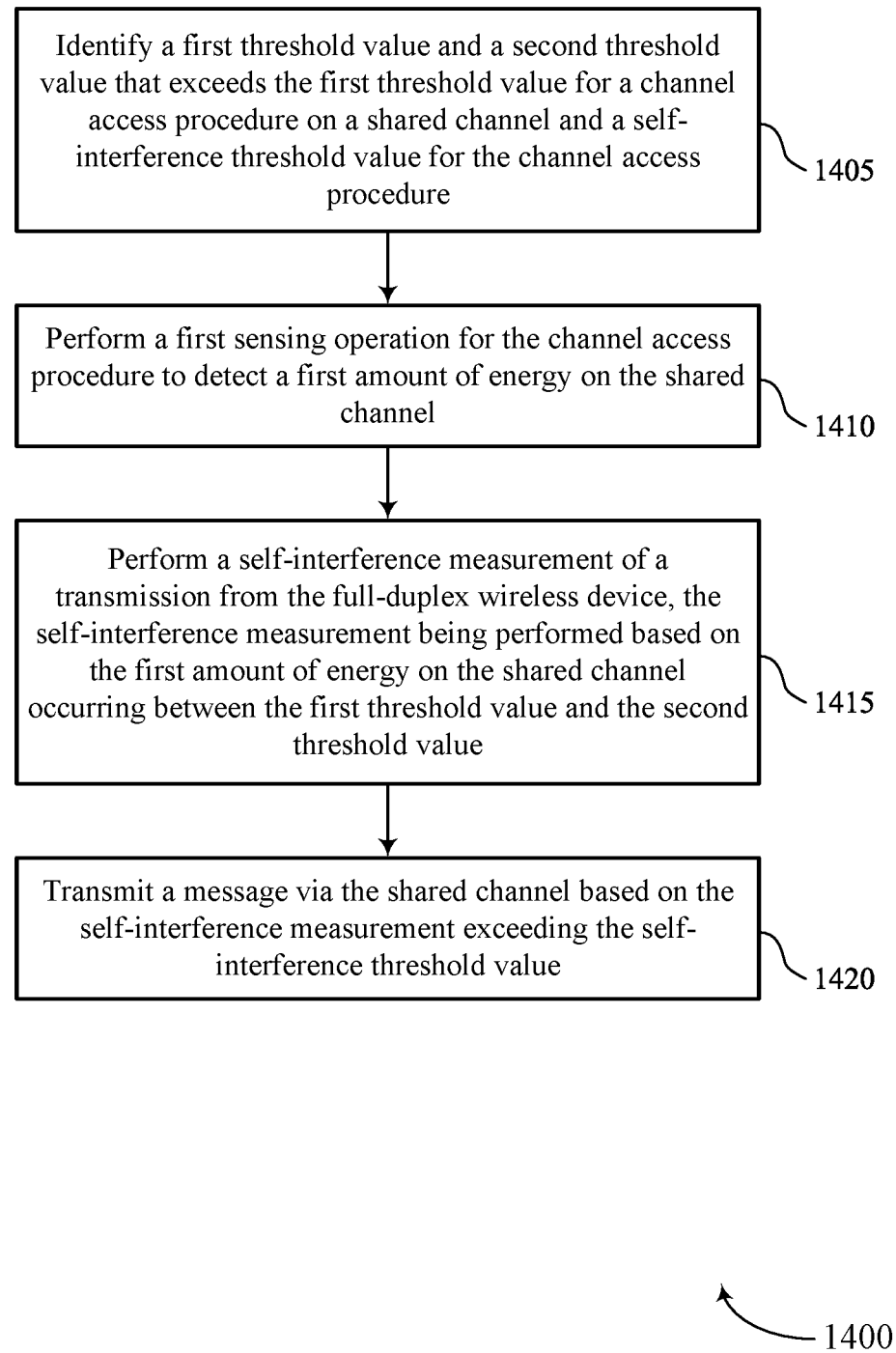
FIGS. 14 through 20 show flowcharts illustrating methods that support multiple thresholds for unlicensed channel access for full-duplex nodes in accordance with aspects of the present disclosure.

FIG. 14 shows a flowchart illustrating a method 1400 that supports multiple thresholds for unlicensed channel access for full-duplex nodes in accordance with aspects of the present disclosure. The operations of the method 1400 may be implemented by a UE or a base station or its components as described herein. For example, the operations of the method 1400 may be performed by a UE 115 as described with reference to FIGS. 1 through 9 or a base station 105 as described with reference to FIGS. 1 through 5 and 10 through 13. In some examples, a UE or a base station may execute a set of instructions to control the functional elements of the UE or the base station to perform the described functions. Additionally or alternatively, the UE or the base station may perform aspects of the described functions using special-purpose hardware.

At 1405, the method may include identifying a first threshold value and a second threshold value that exceeds the first threshold value for a channel access procedure on a shared channel and a self-interference threshold value for the channel access procedure. The operations of 1405 may be performed in accordance with examples as disclosed herein. In some examples, aspects of the operations of 1405 may be performed by a threshold value component 825 or a threshold value component 1225 as described with reference to FIGS. 8 and 12.

At 1410, the method may include performing a first sensing operation for the channel access procedure to detect a first amount of energy on the shared channel. The operations of 1410 may be performed in accordance with examples as disclosed herein. In some examples, aspects of the operations of 1410 may be performed by a sensing operation component 830 or a sensing operation component 1230 as described with reference to FIGS. 8 and 12.

At 1415, the method may include performing a self-interference measurement of a transmission from the full-duplex wireless device, the self-interference measurement being performed based on the first amount of energy on the shared channel occurring between the first threshold value and the second threshold value. The operations of 1415 may be performed in accordance with examples as disclosed herein. In some examples, aspects of the operations of 1415 may be performed by a self-interference measurement component 835 or a self-interference measurement component 1235 as described with reference to FIGS. 8 and 12.

At 1420, the method may include transmitting a message via the shared channel based on the self-interference measurement exceeding the self-interference threshold value. The operations of 1420 may be performed in accordance with examples as disclosed herein. In some examples, aspects of the operations of 1420 may be performed by a message transmission component 840 or a message transmission component 1240 as described with reference to FIGS. 8 and 12.

Figure 15:
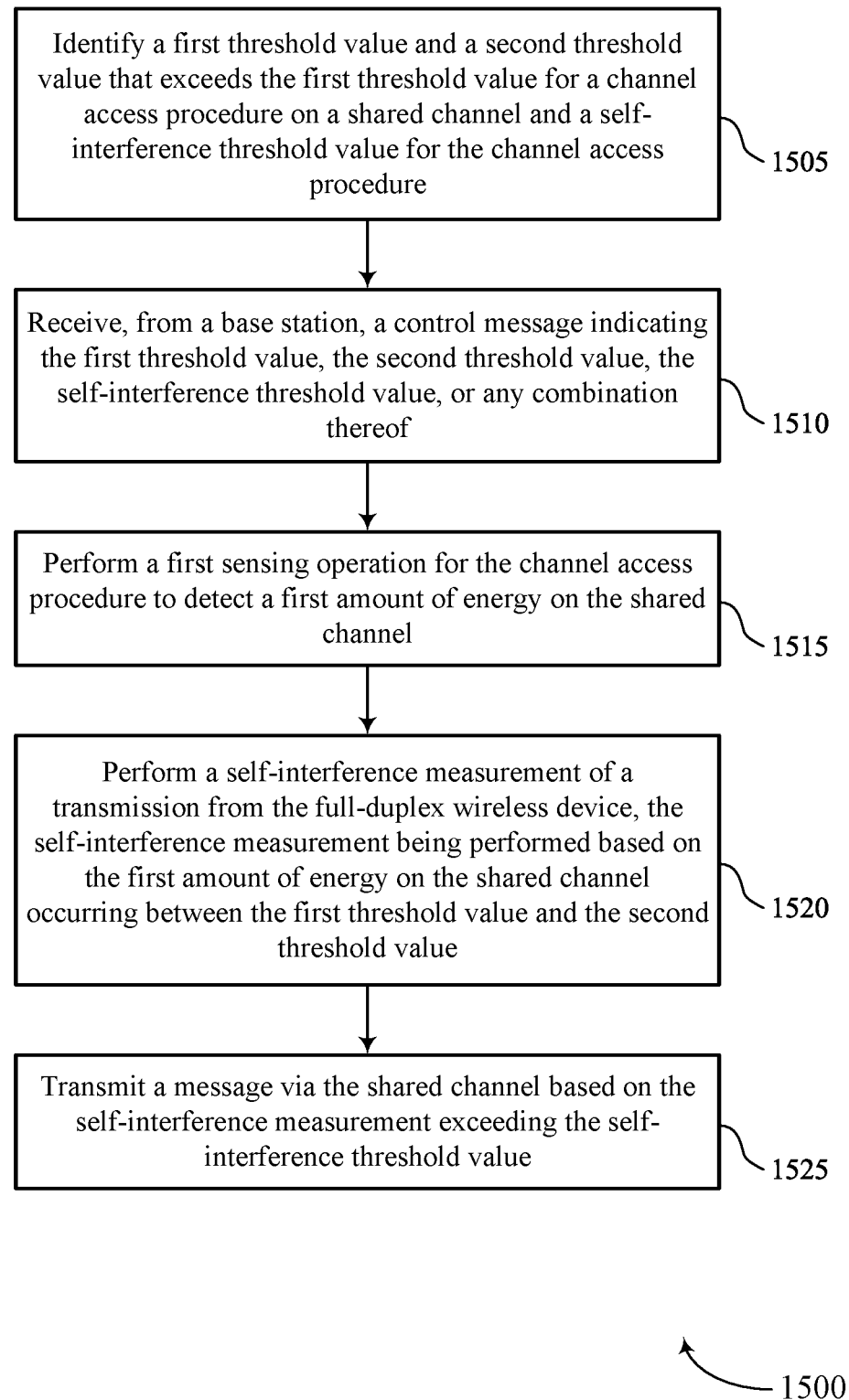

FIG. 15 shows a flowchart illustrating a method 1500 that supports multiple thresholds for unlicensed channel access for full-duplex nodes in accordance with aspects of the present disclosure. The operations of the method 1500 may be implemented by a UE or a base station or its components as described herein. For example, the operations of the method 1500 may be performed by a UE 115 as described with reference to FIGS. 1 through 9 or a base station 105 as described with reference to FIGS. 1 through 5 and 10 through 13. In some examples, a UE or a base station may execute a set of instructions to control the functional elements of the UE or the base station to perform the described functions. Additionally or alternatively, the UE or the base station may perform aspects of the described functions using special-purpose hardware.

At 1505, the method may include identifying a first threshold value and a second threshold value that exceeds the first threshold value for a channel access procedure on a shared channel and a self-interference threshold value for the channel access procedure. The operations of 1505 may be performed in accordance with examples as disclosed herein. In some examples, aspects of the operations of 1505 may be performed by a threshold value component 825 or a threshold value component 1225 as described with reference to FIGS. 8 and 12.

At 1510, the method may include receiving, from a base station, a control message indicating the first threshold value, the second threshold value, the self-interference threshold value, or any combination thereof. The operations of 1510 may be performed in accordance with examples as disclosed herein. In some examples, aspects of the operations of 1510 may be performed by a threshold value component 825 or a threshold value component 1225 as described with reference to FIGS. 8 and 12.

At 1515, the method may include performing a first sensing operation for the channel access procedure to detect a first amount of energy on the shared channel. The operations of 1515 may be performed in accordance with examples as disclosed herein. In some examples, aspects of the operations of 1515 may be performed by a sensing operation component 830 or a sensing operation component 1230 as described with reference to FIGS. 8 and 12.

At 1520, the method may include performing a self-interference measurement of a transmission from the full-duplex wireless device, the self-interference measurement being performed based on the first amount of energy on the shared channel occurring between the first threshold value and the second threshold value. The operations of 1520 may be performed in accordance with examples as disclosed herein. In some examples, aspects of the operations of 1520 may be performed by a self-interference measurement component 835 or a self-interference measurement component 1235 as described with reference to FIGS. 8 and 12.

At 1525, the method may include transmitting a message via the shared channel based on the self-interference measurement exceeding the self-interference threshold value. The operations of 1525 may be performed in accordance with examples as disclosed herein. In some examples, aspects of the operations of 1525 may be performed by a message transmission component 840 or a message transmission component 1240 as described with reference to FIGS. 8 and 12.

Figure 16:
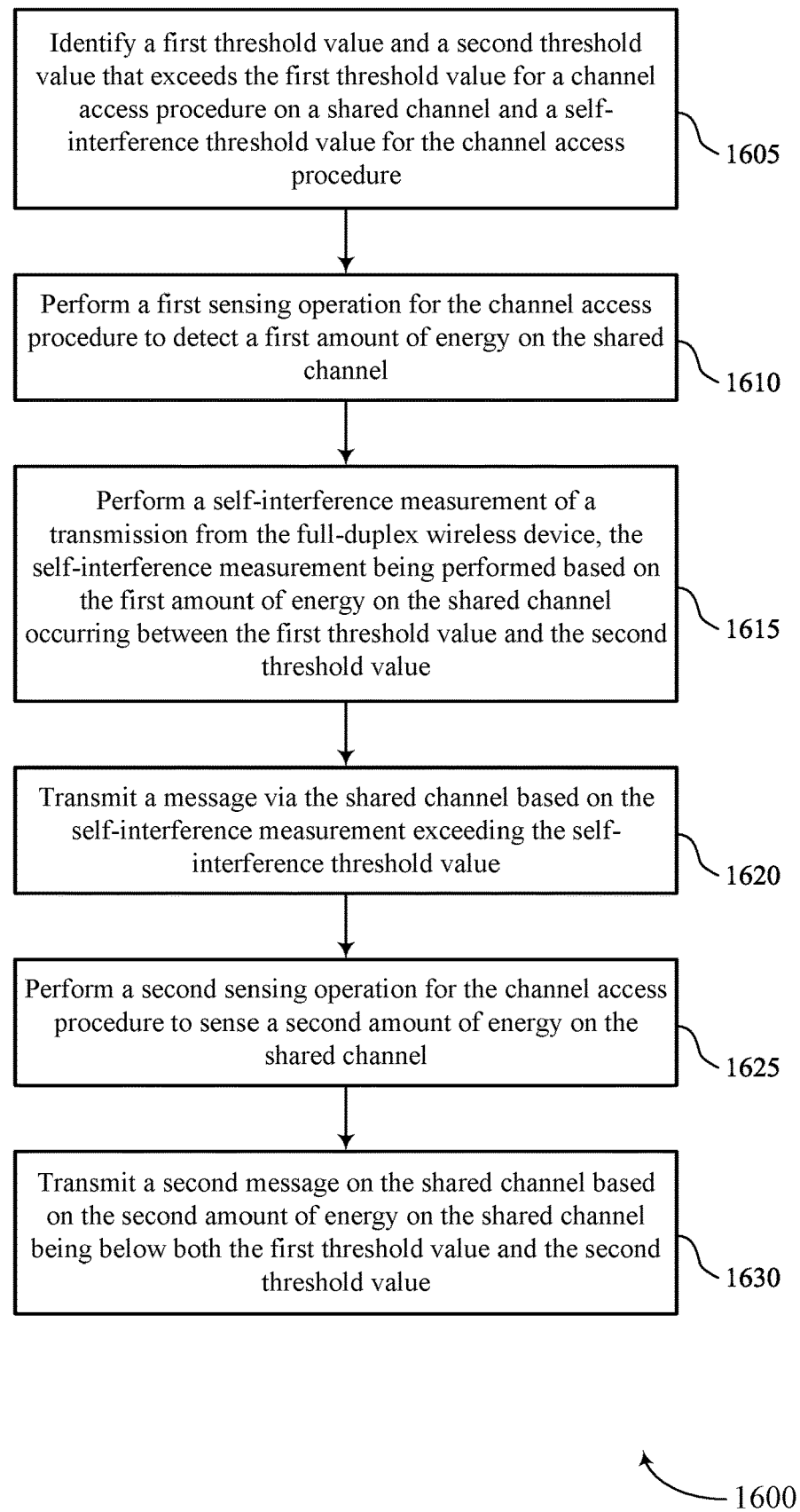

FIG. 16 shows a flowchart illustrating a method 1600 that supports multiple thresholds for unlicensed channel access for full-duplex nodes in accordance with aspects of the present disclosure. The operations of the method 1600 may be implemented by a UE or a base station or its components as described herein. For example, the operations of the method 1600 may be performed by a UE 115 as described with reference to FIGS. 1 through 9 or a base station 105 as described with reference to FIGS. 1 through 5 and 10 through 13. In some examples, a UE or a base station may execute a set of instructions to control the functional elements of the UE or the base station to perform the described functions. Additionally or alternatively, the UE or the base station may perform aspects of the described functions using special-purpose hardware.

At 1605, the method may include identifying a first threshold value and a second threshold value that exceeds the first threshold value for a channel access procedure on a shared channel and a self-interference threshold value for the channel access procedure. The operations of 1605 may be performed in accordance with examples as disclosed herein. In some examples, aspects of the operations of 1605 may be performed by a threshold value component 825 or a threshold value component 1225 as described with reference to FIGS. 8 and 12.

At 1610, the method may include performing a first sensing operation for the channel access procedure to detect a first amount of energy on the shared channel. The operations of 1610 may be performed in accordance with examples as disclosed herein. In some examples, aspects of the operations of 1610 may be performed by a sensing operation component 830 or a sensing operation component 1230 as described with reference to FIGS. 8 and 12.

At 1615, the method may include performing a self-interference measurement of a transmission from the full-duplex wireless device, the self-interference measurement being performed based on the first amount of energy on the shared channel occurring between the first threshold value and the second threshold value. The operations of 1615 may be performed in accordance with examples as disclosed herein. In some examples, aspects of the operations of 1615 may be performed by a self-interference measurement component 835 or a self-interference measurement component 1235 as described with reference to FIGS. 8 and 12.

At 1620, the method may include transmitting a message via the shared channel based on the self-interference measurement exceeding the self-interference threshold value. The operations of 1620 may be performed in accordance with examples as disclosed herein. In some examples, aspects of the operations of 1620 may be performed by a message transmission component 840 or a message transmission component 1240 as described with reference to FIGS. 8 and 12.

At 1625, the method may include performing a second sensing operation for the channel access procedure to sense a second amount of energy on the shared channel. The operations of 1625 may be performed in accordance with examples as disclosed herein. In some examples, aspects of the operations of 1625 may be performed by a sensing operation component 830 or a sensing operation component 1230 as described with reference to FIGS. 8 and 12.

At 1630, the method may include transmitting a second message on the shared channel based on the second amount of energy on the shared channel being below both the first threshold value and the second threshold value. The operations of 1630 may be performed in accordance with examples as disclosed herein. In some examples, aspects of the operations of 1630 may be performed by a sensing operation component 830 or a sensing operation component 1230 as described with reference to FIGS. 8 and 12.

Figure 17:
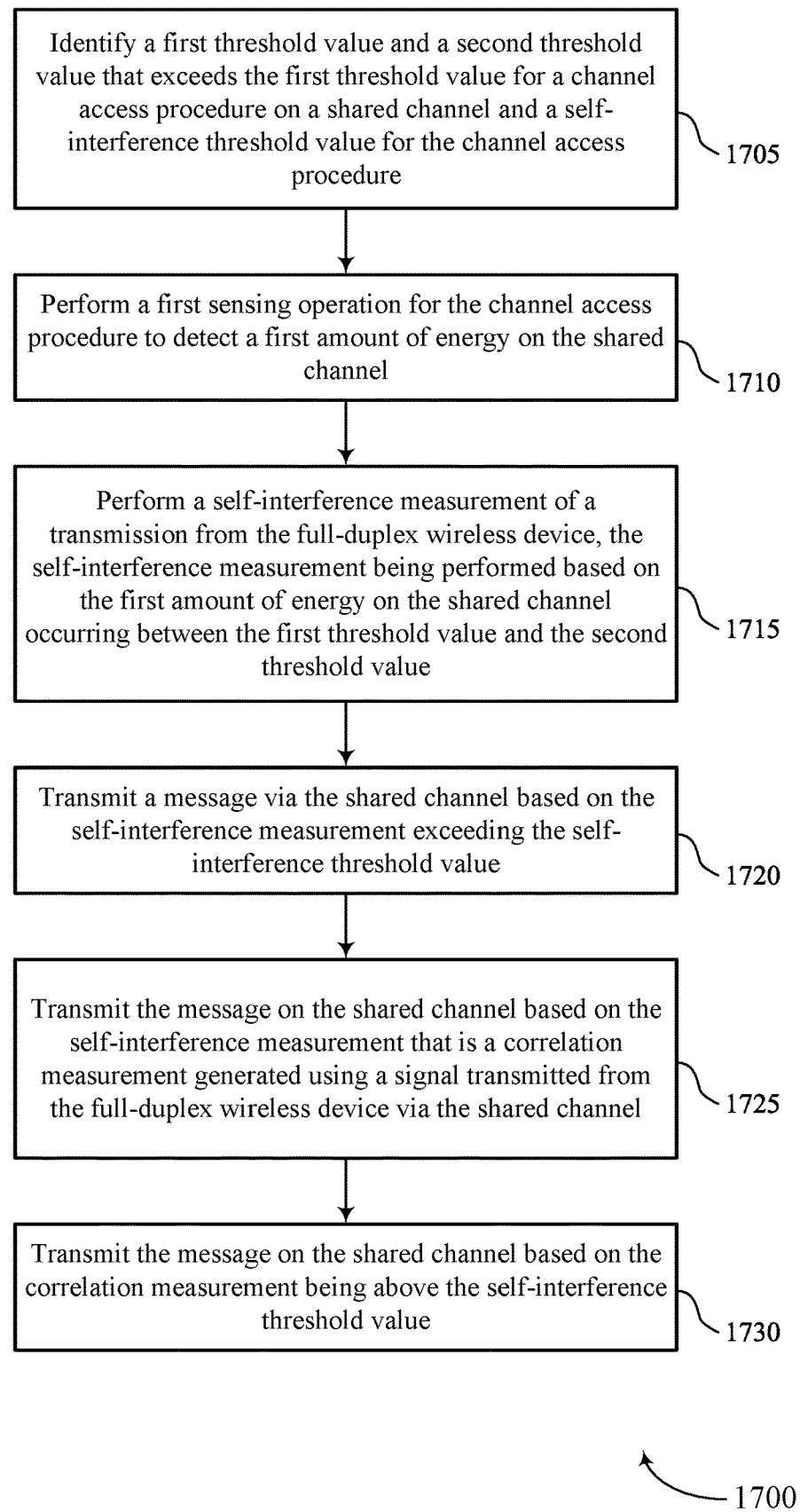

FIG. 17 shows a flowchart illustrating a method 1700 that supports multiple thresholds for unlicensed channel access for full-duplex nodes in accordance with aspects of the present disclosure. The operations of the method 1700 may be implemented by a UE or a base station or its components as described herein. For example, the operations of the method 1700 may be performed by a UE 115 as described with reference to FIGS. 1 through 9 or a base station 105 as described with reference to FIGS. 1 through 5 and 10 through 13. In some examples, a UE or a base station may execute a set of instructions to control the functional elements of the UE or the base station to perform the described functions. Additionally or alternatively, the UE or the base station may perform aspects of the described functions using special-purpose hardware.

At 1705, the method may include identifying a first threshold value and a second threshold value that exceeds the first threshold value for a channel access procedure on a shared channel and a self-interference threshold value for the channel access procedure. The operations of 1705 may be performed in accordance with examples as disclosed herein. In some examples, aspects of the operations of 1705 may be performed by a threshold value component 825 or a threshold value component 1225 as described with reference to FIGS. 8 and 12.

At 1710, the method may include performing a first sensing operation for the channel access procedure to detect a first amount of energy on the shared channel. The operations of 1710 may be performed in accordance with examples as disclosed herein. In some examples, aspects of the operations of 1710 may be performed by a sensing operation component 830 or a sensing operation component 1230 as described with reference to FIGS. 8 and 12.

At 1715, the method may include performing a self-interference measurement of a transmission from the full-duplex wireless device, the self-interference measurement being performed based on the first amount of energy on the shared channel occurring between the first threshold value and the second threshold value. The operations of 1715 may be performed in accordance with examples as disclosed herein. In some examples, aspects of the operations of 1715 may be performed by a self-interference measurement component 835 or a self-interference measurement component 1235 as described with reference to FIGS. 8 and 12.

At 1720, the method may include transmitting a message via the shared channel based on the self-interference measurement exceeding the self-interference threshold value. The operations of 1720 may be performed in accordance with examples as disclosed herein. In some examples, aspects of the operations of 1720 may be performed by a message transmission component 840 or a message transmission component 1240 as described with reference to FIGS. 8 and 12.

At 1725, the method may include transmitting the message on the shared channel based on the self-interference measurement that is a correlation measurement generated using a signal transmitted from the full-duplex wireless device via the shared channel. The operations of 1725 may be performed in accordance with examples as disclosed herein. In some examples, aspects of the operations of 1725 may be performed by a self-interference detection component 845 or a self-interference detection component 1255 as described with reference to FIGS. 8 and 12.

At 1730, the method may include transmitting the message on the shared channel based on the correlation measurement being above the self-interference threshold value. The operations of 1730 may be performed in accordance with examples as disclosed herein. In some examples, aspects of the operations of 1730 may be performed by a self-interference detection component 845 or a self-interference detection component 1255 as described with reference to FIGS. 8 and 12.

Figure 18:
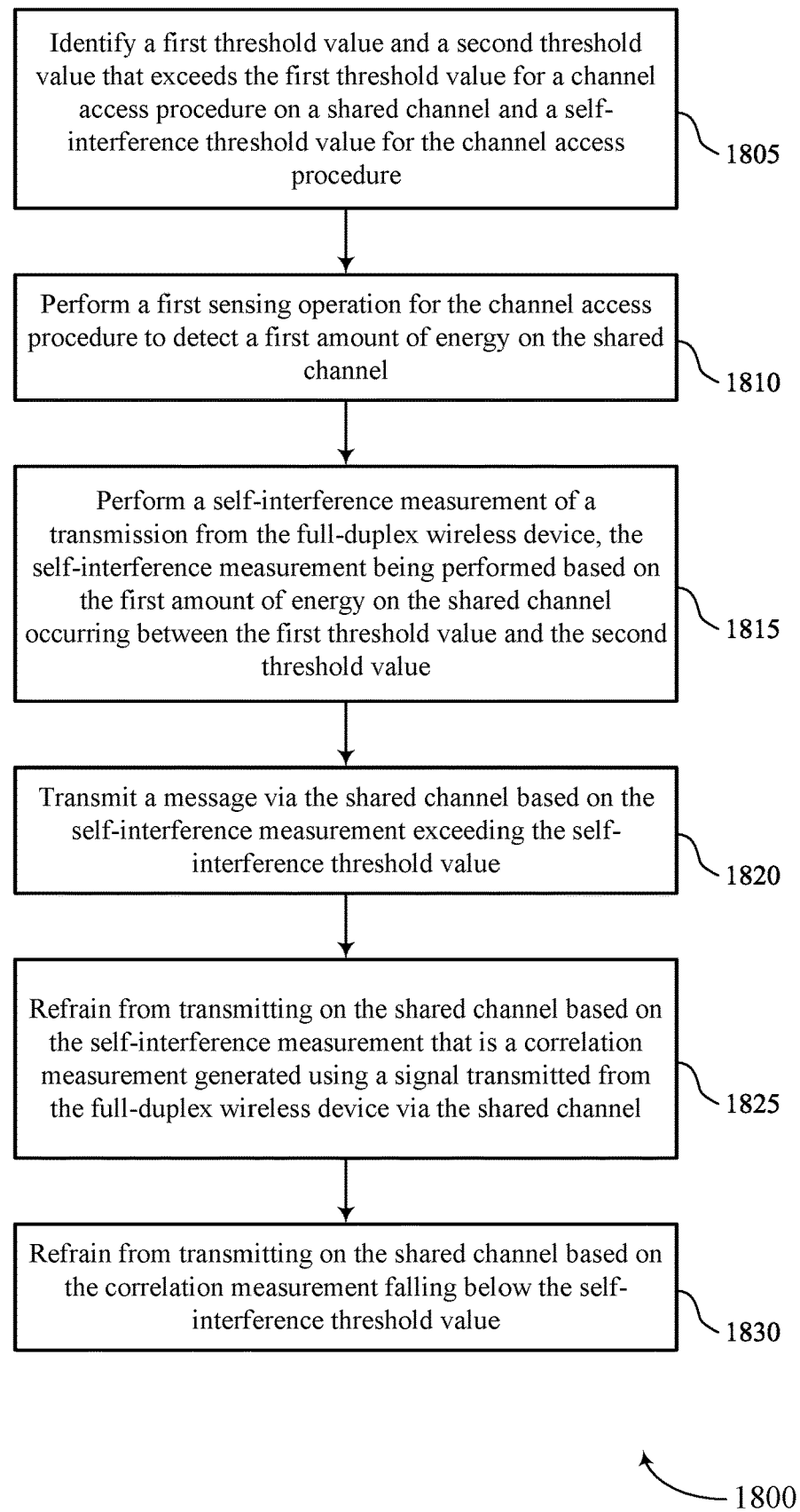

FIG. 18 shows a flowchart illustrating a method 1800 that supports multiple thresholds for unlicensed channel access for full-duplex nodes in accordance with aspects of the present disclosure. The operations of the method 1800 may be implemented by a UE or a base station or its components as described herein. For example, the operations of the method 1800 may be performed by a UE 115 as described with reference to FIGS. 1 through 9 or a base station 105 as described with reference to FIGS. 1 through 5 and 10 through 13. In some examples, a UE or a base station may execute a set of instructions to control the functional elements of the UE or the base station to perform the described functions. Additionally or alternatively, the UE or the base station may perform aspects of the described functions using special-purpose hardware.

At 1805, the method may include identifying a first threshold value and a second threshold value that exceeds the first threshold value for a channel access procedure on a shared channel and a self-interference threshold value for the channel access procedure. The operations of 1805 may be performed in accordance with examples as disclosed herein. In some examples, aspects of the operations of 1805 may be performed by a threshold value component 825 or a threshold value component 1225 as described with reference to FIGS. 8 and 12.

At 1810, the method may include performing a first sensing operation for the channel access procedure to detect a first amount of energy on the shared channel. The operations of 1810 may be performed in accordance with examples as disclosed herein. In some examples, aspects of the operations of 1810 may be performed by a sensing operation component 830 or a sensing operation component 1230 as described with reference to FIGS. 8 and 12.

At 1815, the method may include performing a self-interference measurement of a transmission from the full-duplex wireless device, the self-interference measurement being performed based on the first amount of energy on the shared channel occurring between the first threshold value and the second threshold value. The operations of 1815 may be performed in accordance with examples as disclosed herein. In some examples, aspects of the operations of 1815 may be performed by a self-interference measurement component 835 or a self-interference measurement component 1235 as described with reference to FIGS. 8 and 12.

At 1820, the method may include transmitting a message via the shared channel based on the self-interference measurement exceeding the self-interference threshold value. The operations of 1820 may be performed in accordance with examples as disclosed herein. In some examples, aspects of the operations of 1820 may be performed by a message transmission component 840 or a message transmission component 1240 as described with reference to FIGS. 8 and 12.

At 1825, the method may include refraining from transmitting on the shared channel based on the self-interference measurement that is a correlation measurement generated using a signal transmitted from the full-duplex wireless device via the shared channel. The operations of 1825 may be performed in accordance with examples as disclosed herein. In some examples, aspects of the operations of 1825 may be performed by a self-interference detection component 845 or a self-interference detection component 1255 as described with reference to FIGS. 8 and 12.

At 1830, the method may include refraining from transmitting on the shared channel based on the correlation measurement falling below the self-interference threshold value. The operations of 1830 may be performed in accordance with examples as disclosed herein. In some examples, aspects of the operations of 1830 may be performed by a self-interference detection component 845 or a self-interference detection component 1255 as described with reference to FIGS. 8 and 12.

Figure 19:
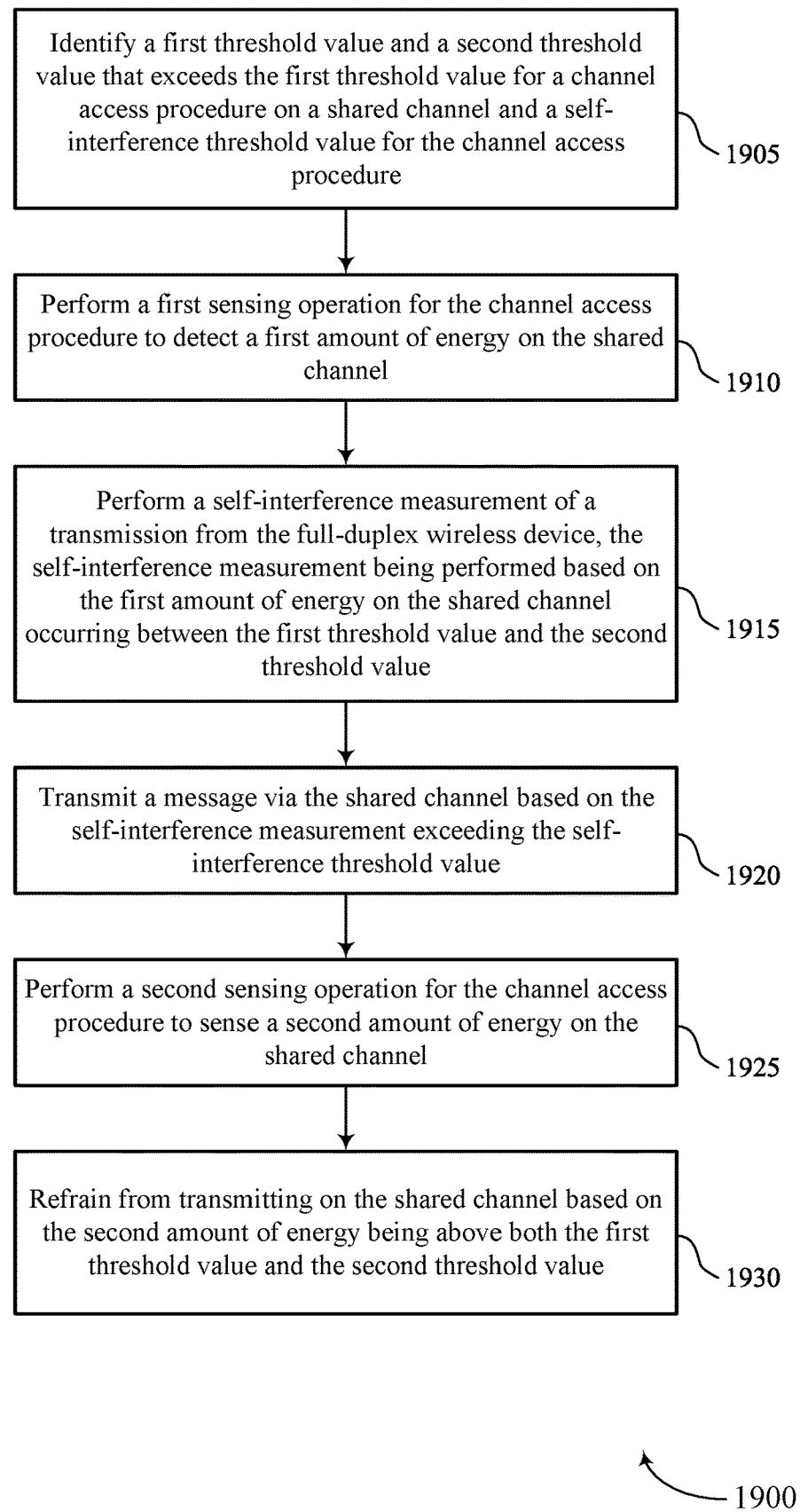

FIG. 19 shows a flowchart illustrating a method 1900 that supports multiple thresholds for unlicensed channel access for full-duplex nodes in accordance with aspects of the present disclosure. The operations of the method 1900 may be implemented by a UE or a base station or its components as described herein. For example, the operations of the method 1900 may be performed by a UE 115 as described with reference to FIGS. 1 through 9 or a base station 105 as described with reference to FIGS. 1 through 5 and 10 through 13. In some examples, a UE or a base station may execute a set of instructions to control the functional elements of the UE or the base station to perform the described functions. Additionally or alternatively, the UE or the base station may perform aspects of the described functions using special-purpose hardware.

At 1905, the method may include identifying a first threshold value and a second threshold value that exceeds the first threshold value for a channel access procedure on a shared channel and a self-interference threshold value for the channel access procedure. The operations of 1905 may be performed in accordance with examples as disclosed herein. In some examples, aspects of the operations of 1905 may be performed by a threshold value component 825 or a threshold value component 1225 as described with reference to FIGS. 8 and 12.

At 1910, the method may include performing a first sensing operation for the channel access procedure to detect a first amount of energy on the shared channel. The operations of 1910 may be performed in accordance with examples as disclosed herein. In some examples, aspects of the operations of 1910 may be performed by a sensing operation component 830 or a sensing operation component 1230 as described with reference to FIGS. 8 and 12.

At 1915, the method may include performing a self-interference measurement of a transmission from the full-duplex wireless device, the self-interference measurement being performed based on the first amount of energy on the shared channel occurring between the first threshold value and the second threshold value. The operations of 1915 may be performed in accordance with examples as disclosed herein. In some examples, aspects of the operations of 1915 may be performed by a self-interference measurement component 835 or a self-interference measurement component 1235 as described with reference to FIGS. 8 and 12.

At 1920, the method may include transmitting a message via the shared channel based on the self-interference measurement exceeding the self-interference threshold value. The operations of 1920 may be performed in accordance with examples as disclosed herein. In some examples, aspects of the operations of 1920 may be performed by a message transmission component 840 or a message transmission component 1240 as described with reference to FIGS. 8 and 12.

At 1925, the method may include performing a second sensing operation for the channel access procedure to sense a second amount of energy on the shared channel. The operations of 1925 may be performed in accordance with examples as disclosed herein. In some examples, aspects of the operations of 1925 may be performed by a sensing operation component 830 or a sensing operation component 1230 as described with reference to FIGS. 8 and 12.

At 1930, the method may include refraining from transmitting on the shared channel based on the second amount of energy being above both the first threshold value and the second threshold value. The operations of 1930 may be performed in accordance with examples as disclosed herein. In some examples, aspects of the operations of 1930 may be performed by a sensing operation component 830 or a sensing operation component 1230 as described with reference to FIGS. 8 and 12.

Figure 20:
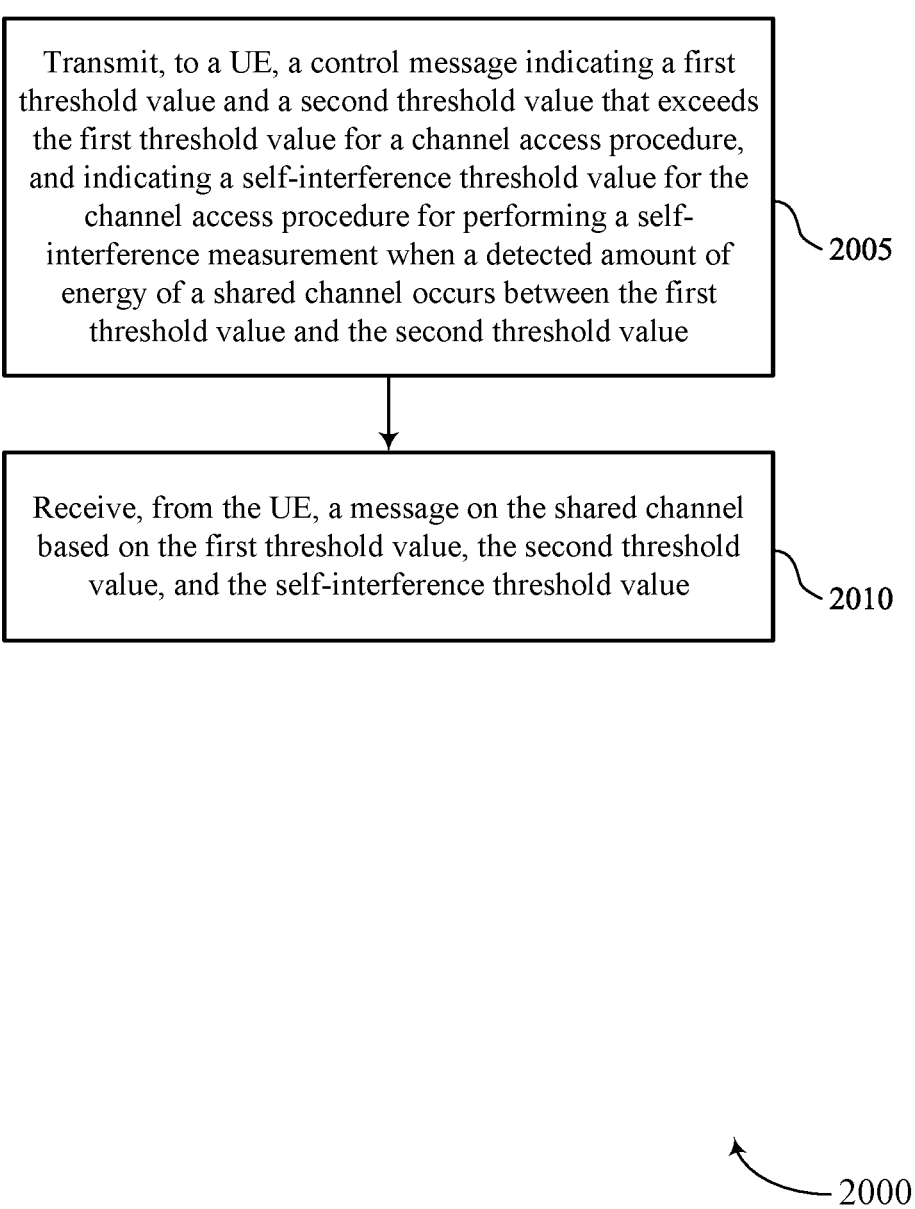

FIG. 20 shows a flowchart illustrating a method 2000 that supports multiple thresholds for unlicensed channel access for full-duplex nodes in accordance with aspects of the present disclosure. The operations of the method 2000 may be implemented by a base station or its components as described herein. For example, the operations of the method 2000 may be performed by a base station 105 as described with reference to FIGS. 1 through 5 and 10 through 13. In some examples, a base station may execute a set of instructions to control the functional elements of the base station to perform the described functions. Additionally or alternatively, the base station may perform aspects of the described functions using special-purpose hardware.

At 2005, the method may include transmitting, to a UE, a control message indicating a first threshold value and a second threshold value that exceeds the first threshold value for a channel access procedure, and indicating a self-interference threshold value for the channel access procedure for performing a self-interference measurement when a detected amount of energy of a shared channel occurs between the first threshold value and the second threshold value. The operations of 2005 may be performed in accordance with examples as disclosed herein. In some examples, aspects of the operations of 2005 may be performed by a threshold value indication component 1245 as described with reference to FIG. 12.

At 2010, the method may include receiving, from the UE, a message on the shared channel based on the first threshold value, the second threshold value, and the self-interference threshold value. The operations of 2010 may be performed in accordance with examples as disclosed herein. In some examples, aspects of the operations of 2010 may be performed by a message reception component 1250 as described with reference to FIG. 12.

The following provides an overview of aspects of the present disclosure:

Aspect 1: A method for wireless communications at a full-duplex wireless device, comprising: identifying a first threshold value and a second threshold value that exceeds the first threshold value for a channel access procedure on a shared channel and a self-interference threshold value for the channel access procedure; performing a first sensing operation for the channel access procedure to detect a first amount of energy on the shared channel; performing a self-interference measurement of a transmission from the full-duplex wireless device, the self-interference measurement being performed based at least in part on the first amount of energy on the shared channel occurring between the first threshold value and the second threshold value; and transmitting a message via the shared channel based at least in part on the self-interference measurement exceeding the self-interference threshold value.

Aspect 2: The method of aspect 1, wherein identifying the first threshold value, the second threshold value, and the self-interference threshold value further comprises: receiving, from a base station, a control message indicating the first threshold value, the second threshold value, the self-interference threshold value, or any combination thereof.

Aspect 3: The method of any of aspects 1 through 2, further comprising: performing a second sensing operation for the channel access procedure to sense a second amount of energy on the shared channel; and transmitting a second message on the shared channel based at least in part on the second amount of energy on the shared channel being below both the first threshold value and the second threshold value.

Aspect 4: The method of any of aspects 1 through 3, wherein transmitting the message further comprises: transmitting the message on the shared channel based at least in part on the self-interference measurement that is a correlation measurement generated using a signal transmitted from the full-duplex wireless device via the shared channel.

Aspect 5: The method of aspect 4, wherein transmitting the message on the shared channel further comprises: transmitting the message on the shared channel based at least in part on the correlation measurement being above the self-interference threshold value.

Aspect 6: The method of any of aspects 1 through 5, wherein the self-interference measurement is a signal-to-noise ratio measurement.

Aspect 7: The method of any of aspects 1 through 6, further comprising: refraining from transmitting on the shared channel based at least in part on the self-interference measurement that is a correlation measurement generated using a signal transmitted from the full-duplex wireless device via the shared channel.

Aspect 8: The method of aspect 7, further comprising: refraining from transmitting on the shared channel based at least in part on the correlation measurement falling below the self-interference threshold value.

Aspect 9: The method of any of aspects 7 through 8, wherein the correlation measurement comprises a signal-to-noise ratio measurement.

Aspect 10: The method of any of aspects 1 through 9, further comprising: performing a second sensing operation for the channel access procedure to sense a second amount of energy on the shared channel; and refraining from transmitting on the shared channel based at least in part on the second amount of energy being above both the first threshold value and the second threshold value.

Aspect 11: The method of any of aspects 1 through 10, wherein the first amount of energy detected on the shared channel comprises an amount of self-interference at the full-duplex wireless device.

Aspect 12: The method of any of aspects 1 through 11, wherein the full-duplex wireless device is a user equipment or a base station.

Aspect 13: A method for wireless communications at a base station, comprising: transmitting, to a UE, a control message indicating a first threshold value and a second threshold value that exceeds the first threshold value for a channel access procedure, and indicating a self-interference threshold value for the channel access procedure for performing a self-interference measurement when a detected amount of energy of a shared channel occurs between the first threshold value and the second threshold value; and receiving, from the UE, a message on the shared channel based at least in part on the first threshold value, the second threshold value, and the self-interference threshold value.

Aspect 14: The method of aspect 13, wherein receiving the message on the shared channel further comprises: receiving the message on the shared channel based at least in part on the detected amount of energy on the shared channel being below both the first threshold value and the second threshold value.

Aspect 15: The method of any of aspects 13 through 14, wherein receiving the message on the shared channel further comprises: receiving the message on the shared channel based at least in part on the detected amount of energy on the shared channel occurring between the first threshold value and the second threshold value and a correlation measurement satisfying the self-interference threshold value.

Aspect 16: The method of aspect 15, wherein the correlation measurement comprises the self-interference measurement, a signal-to-noise ratio measurement, or a combination thereof.

Aspect 17: An apparatus for wireless communications at a full-duplex wireless device, comprising a processor; memory coupled with the processor; and instructions stored in the memory and executable by the processor to cause the apparatus to perform a method of any of aspects 1 through 12.

Aspect 18: An apparatus for wireless communications at a full-duplex wireless device, comprising at least one means for performing a method of any of aspects 1 through 12.

Aspect 19: A non-transitory computer-readable medium storing code for wireless communications at a full-duplex wireless device, the code comprising instructions executable by a processor to perform a method of any of aspects 1 through 12.

Aspect 20: An apparatus for wireless communications at a base station, comprising a processor; memory coupled with the processor; and instructions stored in the memory and executable by the processor to cause the apparatus to perform a method of any of aspects 13 through 16.

Aspect 21: An apparatus for wireless communications at a base station, comprising at least one means for performing a method of any of aspects 13 through 16.

Aspect 22: A non-transitory computer-readable medium storing code for wireless communications at a base station, the code comprising instructions executable by a processor to perform a method of any of aspects 13 through 16.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a full-duplex wireless device, comprising:
   identifying a first threshold value and a second threshold value that exceeds the first threshold value for a channel access procedure on a shared channel and a self-interference threshold value for the channel access procedure;
   performing a first sensing operation for the channel access procedure to detect a first amount of energy on the shared channel;
   performing a self-interference measurement of a transmission from the full-duplex wireless device, the self-interference measurement being performed based at least in part on the first amount of energy on the shared channel occurring between the first threshold value and the second threshold value; and
   transmitting a message via the shared channel based at least in part on the self-interference measurement exceeding the self-interference threshold value.

2. The method of claim 1, wherein identifying the first threshold value, the second threshold value, and the self-interference threshold value further comprises:
   receiving, from a base station, a control message indicating the first threshold value, the second threshold value, the self-interference threshold value, or any combination thereof.

3. The method of claim 1, further comprising:
   performing a second sensing operation for the channel access procedure to sense a second amount of energy on the shared channel; and
   transmitting a second message on the shared channel based at least in part on the second amount of energy on the shared channel being below both the first threshold value and the second threshold value.

4. The method of claim 1, wherein transmitting the message further comprises:
   transmitting the message on the shared channel based at least in part on the self-interference measurement that is a correlation measurement generated using a signal transmitted from the full-duplex wireless device via the shared channel.

5. The method of claim 4, wherein transmitting the message on the shared channel further comprises:
   transmitting the message on the shared channel based at least in part on the correlation measurement being above the self-interference threshold value.

6. The method of claim 1, wherein the self-interference measurement is a signal-to-noise ratio measurement.

7. The method of claim 1, further comprising:
   refraining from transmitting on the shared channel based at least in part on the self-interference measurement that is a correlation measurement generated using a signal transmitted from the full-duplex wireless device via the shared channel.

8. The method of claim 7, further comprising:
refraining from transmitting on the shared channel based at least in part on the correlation measurement falling below the self-interference threshold value.

9. The method of claim 7, wherein the correlation measurement comprises a signal-to-noise ratio measurement.

10. The method of claim 1, further comprising:
performing a second sensing operation for the channel access procedure to sense a second amount of energy on the shared channel; and
refraining from transmitting on the shared channel based at least in part on the second amount of energy being above both the first threshold value and the second threshold value.

11. The method of claim 1, wherein the first amount of energy detected on the shared channel comprises an amount of self-interference at the full-duplex wireless device.

12. The method of claim 1, wherein the full-duplex wireless device is a user equipment or a base station.

13. A method for wireless communications at a base station, comprising:
transmitting, to a user equipment (UE), a control message indicating a first threshold value and a second threshold value that exceeds the first threshold value for a channel access procedure, and indicating a self-interference threshold value for the channel access procedure for performing a self-interference measurement when a detected amount of energy of a shared channel occurs between the first threshold value and the second threshold value; and
receiving, from the UE, a message on the shared channel based at least in part on the first threshold value, the second threshold value, and the self-interference threshold value.

14. The method of claim 13, wherein receiving the message on the shared channel further comprises:
receiving the message on the shared channel based at least in part on the detected amount of energy on the shared channel being below both the first threshold value and the second threshold value.

15. The method of claim 13, wherein receiving the message on the shared channel further comprises:
receiving the message on the shared channel based at least in part on the detected amount of energy on the shared channel occurring between the first threshold value and the second threshold value and a correlation measurement satisfying the self-interference threshold value.

16. The method of claim 15, wherein the correlation measurement comprises the self-interference measurement, a signal-to-noise ratio measurement, or a combination thereof.

17. An apparatus for wireless communications at a full-duplex wireless device, comprising:
a processor;
memory coupled with the processor; and
instructions stored in the memory and executable by the processor to cause the apparatus to:
identify a first threshold value and a second threshold value that exceeds the first threshold value for a channel access procedure on a shared channel and a self-interference threshold value for the channel access procedure;
perform a first sensing operation for the channel access procedure to detect a first amount of energy on the shared channel;
perform a self-interference measurement of a transmission from the full-duplex wireless device, the self-interference measurement being performed based at least in part on the first amount of energy on the shared channel occurring between the first threshold value and the second threshold value; and
transmit a message via the shared channel based at least in part on the self-interference measurement exceeding the self-interference threshold value.

18. The apparatus of claim 17, further comprising a receiver, wherein the instructions to identify the first threshold value, the second threshold value, and the self-interference threshold value are further executable by the processor to cause the apparatus to:
receive, from a base station via the receiver, a control message indicating the first threshold value, the second threshold value, the self-interference threshold value, or any combination thereof.

19. The apparatus of claim 17, wherein the instructions are further executable by the processor to cause the apparatus to:
perform a second sensing operation for the channel access procedure to sense a second amount of energy on the shared channel; and
transmit a second message on the shared channel based at least in part on the second amount of energy on the shared channel being below both the first threshold value and the second threshold value.

20. The apparatus of claim 17, wherein the instructions to transmit the message are further executable by the processor to cause the apparatus to:
transmit the message on the shared channel based at least in part on the self-interference measurement that is a correlation measurement generated using a signal transmitted from the full-duplex wireless device via the shared channel.

21. The apparatus of claim 20, wherein the instructions to transmit the message on the shared channel are further executable by the processor to cause the apparatus to:
transmit the message on the shared channel based at least in part on the correlation measurement being above the self-interference threshold value.

22. The apparatus of claim 17, wherein the self-interference measurement is a signal-to-noise ratio measurement.

23. The apparatus of claim 17, wherein the instructions are further executable by the processor to cause the apparatus to:
refrain from transmitting on the shared channel based at least in part on the self-interference measurement that is a correlation measurement generated using a signal transmitted from the full-duplex wireless device via the shared channel.

24. The apparatus of claim 23, wherein the instructions are further executable by the processor to cause the apparatus to:
refrain from transmitting on the shared channel based at least in part on the correlation measurement falling below the self-interference threshold value.

25. The apparatus of claim 17, wherein the instructions are further executable by the processor to cause the apparatus to:
perform a second sensing operation for the channel access procedure to sense a second amount of energy on the shared channel; and
refrain from transmitting on the shared channel based at least in part on the second amount of energy being above both the first threshold value and the second threshold value.

26. The apparatus of claim 17, wherein the first amount of energy detected on the shared channel comprises an amount of self-interference at the full-duplex wireless device.

27. The apparatus of claim 17, wherein the full-duplex wireless device is a user equipment or a base station.

28. An apparatus for wireless communications at a base station, comprising:
   a processor;
   memory coupled with the processor; and
   instructions stored in the memory and executable by the processor to cause the apparatus to:
      transmit, to a user equipment (UE), a control message indicating a first threshold value and a second threshold value that exceeds the first threshold value for a channel access procedure, and indicating a self-interference threshold value for the channel access procedure for performing a self-interference measurement when a detected amount of energy of a shared channel occurs between the first threshold value and the second threshold value; and
      receive, from the UE, a message on the shared channel based at least in part on the first threshold value, the second threshold value, and the self-interference threshold value.

29. The apparatus of claim 28, further comprising a receiver, wherein the instructions to receive the message on the shared channel are further executable by the processor to cause the apparatus to:
   receive, via the receiver, the message on the shared channel based at least in part on the detected amount of energy on the shared channel being below both the first threshold value and the second threshold value.

30. The apparatus of claim 28, wherein the instructions to receive the message on the shared channel are further executable by the processor to cause the apparatus to:
   receive the message on the shared channel based at least in part on the detected amount of energy on the shared channel occurring between the first threshold value and the second threshold value and a correlation measurement satisfying the self-interference threshold value.

\* \* \* \* \*